United States Patent
Kann

(10) Patent No.: US 9,505,927 B2
(45) Date of Patent: *Nov. 29, 2016

(54) BIOBASED MODIFIERS FOR POLYVINYLCHLORIDE BLENDS

(71) Applicant: Metabolix, Inc., Cambridge, MA (US)

(72) Inventor: Yelena Kann, Marblehead, MA (US)

(73) Assignee: Metabolix, Inc., Woburn, MA (US)

( * ) Notice: Subject to any disclaimer, the term of this patent is extended or adjusted under 35 U.S.C. 154(b) by 244 days.

This patent is subject to a terminal disclaimer.

(21) Appl. No.: 14/043,702

(22) Filed: Oct. 1, 2013

(65) Prior Publication Data

US 2014/0051787 A1 Feb. 20, 2014

Related U.S. Application Data

(63) Continuation-in-part of application No. PCT/US2013/055624, filed on Aug. 19, 2013.

(60) Provisional application No. 61/684,583, filed on Aug. 17, 2012, provisional application No. 61/716,858, filed on Oct. 22, 2012, provisional application No. 61/726,873, filed on Nov. 15, 2012, provisional application No. 61/754,467, filed on Jan. 18, 2013, provisional application No. 61/764,180, filed on Feb. 13, 2013, provisional application No. 61/812,944, filed on Apr. 17, 2013.

(51) Int. Cl.
C08F 8/00 (2006.01)
C08L 67/04 (2006.01)
C08L 27/06 (2006.01)

(52) U.S. Cl.
CPC ............... C08L 67/04 (2013.01); C08L 27/06 (2013.01)

(58) Field of Classification Search
CPC ................................ C08L 67/04; C08L 27/06
USPC ........................................................ 525/55
See application file for complete search history.

(56) References Cited

U.S. PATENT DOCUMENTS 3,592,877 A 7/1971 Mullins
4,393,167 A 7/1983 Holmes et al.
4,477,654 A * 10/1984 Holmes ................. C08G 63/06 106/287.24
7,354,656 B2 4/2008 Mohanty et al.
8,026,301 B2 9/2011 Sumanam
8,680,228 B2 3/2014 Guo et al.
2010/0120307 A1 5/2010 Noh
2011/0183143 A1 7/2011 Tarrit et al.

FOREIGN PATENT DOCUMENTS

EP 0435 435 A2 7/1991
EP 1 657 280 A1 5/2006
GB 2 442 333 A 4/2008

OTHER PUBLICATIONS

Salamone J., ed., Polymeric Materials Encyclopedia, vol. 6, p. 4307, 1996.*
Lotti, N., et al, "Binary blends of microbial poly (3-hydroxybutyrate) with polymethacrylates," *Polymer*, 34(23): 4935-4940 (1993).
Na, Y.H, et al. "Phase-separation enhanced enzymatic degradation of atactic poly (R,S-3-hydroxybutyrate) in the blends with poly(methyl methacrylate)," *Polymer Degradation and Stability*, 79:535-545 (2003).
Choe, S., et al. "Miscibility of poly (3-hydroxybutyrate-co-3-hydroxyvalerate) and poly (vinyl chloride) blends," *Polymer*, 36 (26): 4977-4982 (1995).
Cox, M.K, "Recycling Biopol—Composting and Material Recycling," *Pure Appl. Chem.*, 32(4):607-612 (1995).
International Search Report and Written Opinion issued in International Application No. PCT/US2013/055624, "Biobased Rubber Modifiers for Polymer Blends," Date of Mailing: Nov. 6, 2013.

* cited by examiner

*Primary Examiner* — Hui Chin
(74) *Attorney, Agent, or Firm* — Foley Hoag LLP

(57) ABSTRACT

Compositions of polymer blends of polyvinylchloride (PVC) and polyhydroxyalkanoate (PHA) are described. In certain embodiments, the PHA is a poly-3-hydroxybutyrate-co-4-hydroxybutyrate copolymer having a weight percent 4-hydroxybutyrate of 30-45%. In other embodiments the PHA is a multiphase P3HB-4HB copolymer blend having one phase fully amorphous. The PHA is mixed with the PVC to optimize its optical, thermal and mechanical properties. In certain embodiments, the polymer is branched with optionally additives that improve properties. Methods of making the compositions of the invention are also described. The invention also includes articles, films and laminates comprising the compositions.

14 Claims, 5 Drawing Sheets

BIOBASED MODIFIERS FOR POLYVINYLCHLORIDE BLENDS

RELATED APPLICATIONS

This application is a continuation-in-part of International Application No. PCT/US2013/055624, which designated the United States and was filed on Aug. 19, 2013, which claims the benefit of U.S. Provisional Application Nos. 61/684,583 filed on Aug. 17, 2012; 61/716,858 filed on Oct. 22, 2012; 61/726,873 filed on Nov. 15, 2012; 61/754,467 filed on Jan. 18, 2013; 61/764,180 filed on Feb. 13, 2013 and 61/812,944 filed on Apr. 17, 2013. The entire teachings of the above applications are incorporated herein by reference

BACKGROUND OF THE INVENTION

Despite some recent concerns about the environmental fate of halogenated polymers, polyvinyl chloride (PVC) still remains one of the major commodity polymers produced and consumed worldwide. This is primarily due to the low cost to produce and process PVC as well as the ability to form PVC products having a wide range of material properties (from flexibly to rigid). Recent life-cycle studies have shown that vinyl products perform very favorably in terms of energy efficiency, have high thermal insulating value, low contribution to greenhouse gas production, are low maintenance and have outstanding product durability. However like most commodity polymers, PVC is made from 100% petroleum-based feedstocks and is therefore not environmentally sustainable.

Because of PVC's poor thermal stability, stiffness and propensity for brittle fracture, it needs to be compounded with a significant amount of additives such as processing aids, heat stabilizers, plasticizers and impact modifiers in order to make useful products. Polyvinylchloride is usually plasticized to achieve flexibility however plasticization can adversely affect other PVC material properties such as impact strength and tensile toughness. A material property balance must be achieved therefore when formulating with plasticizers. Plasticizers properties such as miscibility are very important in enhancing PVC property performance. If plasticizers are not miscible and are of low molecular, they tend to migrate to the surface of the PVC and are then easily removed by extraction or volatilization which leads a loss of properties for the PVC product.

To mitigate PVC property changes when formulating with plasticizers, it is common to add rubbery polymeric impact modifiers to improve the toughness of PVC compounds. These impact modifiers however are often not miscible with PVC and require a grafted polymeric outer layer which is able to adhere to the PVC matrix while being chemically bonded to a rubbery polymeric core. It is the rubbery core which is able to dissipate the energy of impact. These type of impact modifiers are often not UV and oxidatively stable and therefore require additional UV and antioxidant stabilizers. Formulation with the PVC then becomes very complex. Therefore a need exists for miscible, stable and easy to handle polymeric modifiers or additives for PVC that have good short and long term, thermal, UV and oxidative stability but provide good impact and/or plasticizing properties.

SUMMARY OF THE INVENTION

Described herein are polymer blend compositions of polyvinyl chloride (PVC) with polyhydroxyalkanoates (PHAs) that have improved properties including but not limited to improved UV stability, oxidative stability, thermal stability, melt flow and fungal resistance. For example, at least one of the optical, thermal and mechanical properties are improved, for example, by at least 10% over PVC compositions without the poly-3-hydroxybutylrate copolymers, or by at least 20%, or by at least 30%, or by at least 40% or by at least 50% or greater than these numbers. Additionally, the improvement may include that additives for stability are no longer needed or are needed at reduced amounts. These improvements can translate into reduced costs related to composition requirements or processing. Additionally, it may be possible to produce new products that were not economical or foreseeable due to limitations of the PVC that are now removed with the addition of poly-3-hydroxybutylrate copolymers.

In a first aspect of the invention, the composition is a polymer blend of a polyvinyl chloride (PVC) polymer and a biobased non-extractable, non-volatile plasticizing polyhydroxyalkanoate copolymer or blend thereof (PHA), wherein the PHA comprises a copolymer of 3-polyhydroxybutylrate and one more monomers selected from lactic acid, 3-hydroxypropionic acid (3HP), 4-hydroxybutyrate (4HB), 5-hydroxyvalerate (5HV), 3-hydroxyhexanoate (3HH), 6-hydroxyhexanoate (6HH) and 3-hydroxyoctanoate (3HO), wherein the monomer content is about 25-90% of the weight of the PHA (for example about 30% to about 75%, or about 25% to about 40%) and wherein the PHA unexpectedly improves the material performance of the PVC polymer blend. As described herein, it was found that for improving properties of soft (flexible) PVC products, including films and the like, the addition of PHA having a low glass transition temperature (Tg) component and a relatively low percent crystallinity (<40%) is required (for example, about 26-45%, about 30-40% or about 28-38%). For modification of rigid PVC, it was useful to add PHA's with a low Tg as the major component but having a percent crystallinity even lower (<10%, for example about 0.5 to 5 percent, about 1 to 8%, about 2-5% about 3%, about 4%, about 5%, about 6%, about 7%, about 8%, about 9%). The most desirable aspects of the PHA's suitable for practicing the invention are their combination of material properties, in particular glass transition temperature, percent crystallinity and degree of miscibility with PVC resins. In general, PHA copolymers with low glass transition temperatures have a low degree of crystallinity and are mostly amorphous materials having properties very similar to a rubber-type polymer but additionally have some level of miscibility with the polymer resin of interest. PHA's having partial or complete miscibility with PVC or other resins are advantageous. It is noted that highly crystalline PHA's such as the homopolymer poly-3-hydroxybutyrate (P3HB) or copolymers of poly-3-hydroxybutyrate-co-3-hydroxyvalerate by themselves do not possess the necessary properties but when combined with the compositions of the invention in a "PHA" blend then the "PHA" blend is used as the modifier. Other key aspects of the invention include the selection of stabilizer packages chosen such that they do not reduce the benefits of the PHA modifier by thermally degrading the PHA during melt processing of the blend. The PHA can also extend the life of stabilizers, improve the color stability of the PVC and delay crosslinking reactions which are associated with end-of-service life or PVC products. Additionally in certain embodiments of the any of the aspects of the invention described herein, the PHA copolymer has a percent crystallinity of about 0.2 to 1% as measured by DSC. In another embodiment of any of the aspects described herein the solubility parameters of the monomers of the PHA copolymer are about 17 to about 21 ($\delta_{total}$(J/cm$^3$)$^{1/2}$).

In a second aspect, the PHA of the composition is a PHA copolymer of 3-polyhydroxybutylrate and one more monomers selected from the group comprising lactic acid, 3-hydroxypropionic acid (3HP), 4-hydroxybutyrate (4HB), 5-hydroxyvalerate (5HV), 3-hydroxyhexanoate (3HH), 6-hydroxyhexanoate (6HH) and 3-hydroxyoctanoate (3HO) or blend thereof. In an embodiment of the first aspect, the copolymers comprise P3HB-co-4HB, P3HB-co-5HV and P3HB-co-6HH with a comonomer percent from 25-90% by weight. Poly-3-hydroxybutyrate-co-3-hydroxyvalerate is not part of the invention because it forms a very highly crystalline PHA (isodimorphic structure) material which is not suitable for the applications described herein.

In a third aspect, the PHA copolymer is a multiphase copolymer blend of PHA, having an amorphous (flexible) rubber phase with a T$_g$ between about −15° C. and about −45° C. and is between about 2 weight % to about 45 weight % of the total PHA in the composition. Preferably the rubber phase is 5-30% by weight of the PHA copolymer blend. In a fourth aspect, the multiphase copolymer blend of PHA comprises at least two phases. In a fifth aspect, the multiphase copolymer blend includes a PHA copolymer as described above and a poly-3-hyroxybutyrate homopolymer. In a sixth aspect, the PHA is a two phase PHA copolymer with greater than 11% 4HB comonomer content of the total PHA polymer. In a seventh aspect, the PHA comprises an amorphous rubber phase having 3-hydroxybutyrate (3HB) and 4-hydroxybutyrate (4HB) comonomer segments with a weight % 4HB of about 25% to about 90% of the PHA composition. In an eighth aspect, the PHA comprises an amorphous rubber phase having 3-hydroxybutyrate (3HB) and 4-hydroxybutyrate (4HB) with a weight % 4HB of about 25% to about 55% in the PHA composition. In a ninth aspect the PHA comprises an amorphous rubber phase having 3-hydroxybutyrate (3HB) and 4-hydroxybutyrate (4HB) with a weight % 4HB of about 25% to about 35% in the PHA composition. In a tenth aspect, the PHA comprises an amorphous rubber phase having no melting point. In an eleventh aspect, the PHA is selected from a blend of 18-22% P3HB and 77-83% P3HB-4HB copolymer with 8-14% 4HB by weight; a blend of 34-38% P3HB, a blend of 22-26% P3HB-4HB copolymer with 8-14% 4HB by weight and 38-42% P3HB-4HB copolymer with 25-33% 4HB by weight; a blend of 10-15% P3HB, 46-50% P3HB-4HB copolymer with 8-14% 4HB by weight and 38-42% P3HB-4HB copolymer with 25-33% 4HB by weight or Tianjin SOGREEN® (PHA) with 30% 4HB content. In a twelfth aspect, the PHA polymer is included in a PHA masterbatch comprising a PHA crosslinked with a peroxide and a co-agent blended with an acrylonitrile-styrene-acrylate terpolymer or chlorinated polyethylene.

In a first embodiment of any one or more of the first to twelfth aspects, the PHA has an average molecular weight range of about 50,000 to about 2.5 million g/mole. In a second embodiment of any one or more of the first to twelfth aspects and further including the first embodiment, the PVC has a K-value of between 57 and 70. In a third embodiment of any one or more of the first to twelfth aspects, or further including the first or second embodiment, the amount of PHA in the polymer composition (PHA plus PVC plus any other polymer present) is about 1% to about 50% by weight of the total composition. In a fourth embodiment of any one or more of the first to twelfth aspects, or further including the first, second and or third embodiment, the amount of PHA in the polymer composition is about 3% to about 40% by weight of the total composition or the amount of PHA in the polymer composition is about 20% to about 30% by weight of the total composition.

In a fifth embodiment of any one or more of the first to twelfth aspects, or further including the first, second, third and/or fourth embodiment, the composition further includes a branching agent and a co-agent. Branching agents are highly reactive molecules which form free radicals. When blended with polymers, the free radicals formed by the branching agents then react with the polymer chain to form a polymer free radical which is then able to chemically link itself to another polymer chain thereby forming a branch or crosslink. These agents are selected from any suitable initiator known in the art, such as peroxides, azo-derivatives (e.g., azo-nitriles), peresters, and peroxycarbonates. Branching agents are added to the polymers at 0.05%, 0.1%, 0.2%, 0.3%, 0.4%, 0.5%, 0.6%, 0.7%, 0.8%, 1.0%, 1.2%, 1.5%, 1.7% or 2% by weight of the PHA polymer. In a preferred embodiment, the branching agent is reactively extruded with the PHA prior to blending the PHA with a rigid PVC polymer. As shown in the examples, the branched PHA improves the impact resistance of the rigid PVC without diminishing other physical properties of the PHA/PVC blend such as flexural modulus, tensile strength and toughness. In a further embodiment, co-agents or crosslinking agents are optionally added during reactive extrusion of the branching agent with the PHA to enhance the branching effect. Co-agents for reacting with the PHA polymer include, for example, diallyl phthalate, pentaerythritol tetraacrylate, trimethylolpropane triacrylate, pentaerythritol triacrylate, dipentaerythritol pentaacrylate, diethylene glycol dimethacrylate, bis(2-methacryloxyethyl) phosphate, or combinations thereof, an epoxy-functional styrene-acrylic polymer, an epoxy-functional acrylic copolymer, an epoxy-functional polyolefin copolymer, an oligomer comprising a glycidyl group with an epoxy functional side chain, an epoxy-functional poly(ethylene-glycidyl methacrylate-co-methacrylate), or combinations thereof. The co-agent can be premixed with a nonreactive plasticizer then added to the PHA.

In a sixth embodiment of any one or more of the first to twelfth aspects, or further including the first, second, third, fourth and/or fifth embodiment, the composition further includes one or more additives (e.g., plasticizers, clarifiers, nucleating agents, UV, thermal or oxidative stabilizers, inorganic fillers, anti-slip agents, compatibilizers, blocking agents or a combination thereof). Additives such as plasticizers can be derived from renewable or petroleum resources. Addition of inert inorganic fillers such as calcium carbonate or silica to the PHA copolymer's having high comonomer content (≥25% by weight), help reduce the tackiness of the PHA "rubber" and make it easier to handle and process with the PVC. In certain compositions of the invention (including the aspects and embodiments above, the additives are biobased (e.g., the biobased content is between 5% and 100%). In a sixth embodiment of any one or more of the first to the twelfth aspects of the invention and optionally including one or more of the embodiments described, the PHA is added between 5 and 50 parts per hundred (phr) polyvinyl chloride. In a seventh embodiment of one or more of the first to twelfth aspects and optionally further including one or more of the embodiments described, the composition is optically transparent. In an eighth embodiment of one or more of the first to twelfth aspects and optionally including one or more of the embodiments described, the PVC polymer and PHA polymer are miscible. In a ninth embodiment of one or more of the first to twelfth aspects and optionally including one or more of the embodiments described, the composition is a flexible or rigid PVC and PHA composition. In a tenth embodiment of one or more of the first to twelfth aspects and optionally including one or more of the embodiments described, the biobased PHA is between about 40% and about 100% biobased content. In an eleventh embodiment of any of the compositions or methods described, the composition has a biobased content of 5-100% (e.g., 5%-20%, 10%-30%, 15%-40%, 20-50%, 25-60%, 30-70%, 40-100%, 40-70%, 40-80%, greater than 80% to about 100%, 90%, 91%, 92%, 93%, 94%, 95%, 96%, 97%, 98%, 99%, 99.5% or 100%).

In a seventh embodiment of any one or more of the one to twelfth aspects, the PHA copolymer or blend is thermolyzed.

A method of preparing a polyvinyl chloride (PVC)/polyhydroxyalkanoate (PHA) polymer blend composition, comprising melt blending the composition of the invention as described above using a single or twin screw extruder, two-roll mill, Banbury mixer or the like thereby forming a polymer composition of PVC and PHA are also described. The PHA can be branched or crosslinked using reactive extrusion prior to blending with the PVC. The compositions of any of the aspects or embodiments of the invention can be produced as a PHA impact modifier masterbatch, a film, an article (e.g., an article that is used in medical treatments), sheet or multilayer laminate. In certain applications, the article has greater tensile elongation with greater tensile toughness than a corresponding polymer article consisting only of PVC polymer with no PHA added.

In a seventh embodiment of any of the first to twelfth aspects or including any one or more of the embodiments described above, the compositions further comprise an impact modifies, e.g., a modifier produced by graft polymerization of acrylates or methacrylates with butadiene rubber and styrene (acrylate-butadiene-styrene (ABS) and methacrylate-butadiene-styrene (MBS), In certain embodiments of the invention, the PHA copolymer is further blended with another biobased PHA for use in the compositions. These PHA polymer, copolymer and blends comprise the following polymers alone or in combination: poly(3-hydroxybutyrate) homopolymer, a poly(3-hydroxybutyrate-co-4-hydroxybutyrate), a poly(3-hydroxybutyrate-co-3-hydroxyvalerate), a poly(3-hydroxybutyrate-co-5-hydroxyvalerate), or a poly(3-hydroxybutyrate-co-3-hydroxyhexanoate) with the proviso that the PHA composition is not 100% poly(3-hydroxybutyrate) homopolymer or 100% poly(3-hydroxybutyrate-co-3-hydroxyvalerate) as these polymers have a high degree of crystallinity and are not suitable for practicing this invention; a poly(3-hydroxybutyrate-co-4-hydroxybutyrate) with 5% to 15% 4-hydroxybutyrate content, a poly(3-hydroxybutyrate-co-5-hydroxyvalerate) with 5% to 15% 5-hydroxyvalerate content, or a poly(3-hydroxybutyrate-co-3-hydroxyhexanoate) with 3% to 15% 3-hydroxyhexanoate content; a) a poly(3-hydroxybutyrate) homopolymer blended with b) a poly(3-hydroxybutyrate-co-4-hydroxybutyrate); a) a poly(3-hydroxybutyrate) homopolymer blended with b) a poly(3-hydroxybutyrate-co-3-hydroxyhexanoate); a) a poly(3-hydroxybutyrate-co-4-hydroxybutyrate) blended with b) a poly(3-hydroxybutyrate-co-3-hydroxyvalerate)); a) a poly(3-hydroxybutyrate-co-4-hydroxybutyrate) blended with b) a poly(3-hydroxybutyrate-co-3-hydroxyhexanote, or a) a poly(3-hydroxybutyrate-co-3-hydroxyvalerate),) blended with b) a poly(3-hydroxybutyrate-co-3-hydroxyhexanoate); a) a poly(3-hydroxybutyrate) homopolymer blended with b) a poly(3-hydroxybutyrate-co-4-hydroxybutyrate) with a 5% to 15% 4-hydroxybutyrate content; a) a poly(3-hydroxybutyrate) homopolymer blended with b) a poly(3-hydroxybutyrate-co-3-hydroxyvalerate) with a 5% to 22% 3-hydroxyvalerate content; a) a poly(3-hydroxybutyrate) homopolymer blended with b) a poly(3-hydroxybutyrate-co-3-hydroxyhexanoate) with a 3% to 15% 3-hydroxyhexanoate content; a) a poly(3-hydroxybutyrate-co-4-hydroxybutyrate) with a 5% to 15% 4-hydroxybutyrate content blended with b) a poly(3-hydroxybutyrate-co-3-hydroxyvalerate) with a 5% to 22% 3-hydroxyvalerate content; a) a poly(3-hydroxybutyrate-co-4-hydroxybutyrate) with 5% to 15% 4-hydroxybutyrate content blended with b) a poly(3-hydroxybutyrate-co-3-hydroxyhexanoate) with a 3% to 15% 3-hydroxyhexanoate content or a) a poly(3-hydroxybutyrate-co-3-hydroxyvalerate) with a 5% to 22% 3-hydroxyvalerate content blended with b) a poly(3-hydroxybutyrate-co-3-hydroxyhexanoate) with a 3% to 15% 3-hydroxyhexanoate content, a) a poly(3-hydroxybutyrate) homopolymer blended with b) a poly(3-hydroxybutyrate-co-4-hydroxybutyrate) and the weight of polymer a) can be 5% to 95% of the combined weight of polymer a) and polymer b); a) a poly(3-hydroxybutyrate) homopolymer blended with b) a poly(3-hydroxybutyrate-co-3-hydroxyvalerate) and the weight of polymer a) can be 5% to 95% of the combined weight of polymer a) and polymer b); a) poly(3-hydroxybutyrate) homopolymer blended to with b) a poly(3-hydroxybutyrate-co-3-hydroxyhexanoate) and the weight of polymer a) can be 5% to 95% of the combined weight of polymer a) and polymer b); a) a poly(3-hydroxybutyrate-co-4-hydroxybutyrate) blended with b) a poly(3-hydroxybutyrate-co-3-hydroxyvalerate) and the weight of polymer a) can be 5% to 95% of the combined weight of polymer a) and polymer b); a) a poly(3-hydroxybutyrate-co-4-hydroxybutyrate) blended with b) a poly(3-hydroxybutyrate-co-3-hydroxyhexanoate) and the weight of polymer a) can be 5% to 95% of the combined weight of polymer a) and polymer b); or a) a poly(3-hydroxybutyrate-co-3-hydroxyvalerate) blended with b) a poly(3-hydroxybutyrate-co-3-hydroxyhexanoate) and the weight of polymer a) can be 5% to 95% of the combined weight of polymer a) and polymer b) or the weight of polymer a) is 20% to 60% of the combined weight of polymer a) and polymer b) and the weight of polymer b) or 40% to 80% of the combined weight of polymer a) and polymer b).

In other embodiments, the PHA copolymer is further blended with a biobased PHA comprises a) poly(3-hydroxybutyrate) homopolymer blended with b) a poly(3-hydroxybutyrate-co-4-hydroxybutyrate) with a 20-50% 4-hydroxybutyrate content; a) a poly(3-hydroxybutyrate) homopolymer blended with b) a poly(3-hydroxybutyrate-co-5-hydroxyvalerate) with a 20% to 50% 5-hydroxyvalerate content; a) a poly(3-hydroxybutyrate) homopolymer blended with b) a poly(3-hydroxybutyrate-co-3-hydroxyhexanoate) having a 5%-50% 3-hydroxyhexanoate content; a) poly(3-hydroxybutyrate-co-4-hydroxybutyrate) with a 5% to 15% 4-hydroxybutyrate content blended with b) a poly(3-hydroxybutyrate-co-4-hydroxybutyrate) with a 20-50% 4-hydroxybutyrate content; a) poly(3-hydroxybutyrate-co-4-hydroxybutyrate) with a 5% to 15% 4-hydroxybutyrate content blended with b) a poly(3-hydroxybutyrate-co-5-hydroxyvalerate) with a 20% to 50% 5-hydroxyvalerate content; a) poly(3-hydroxybutyrate-co-4-hydroxybutyrate) with 5% to 15% 4-hydroxybutyrate content blended with b) a poly(3-hydroxybutyrate-co-3-hydroxyhexanoate) having a 5%-50% 3-hydroxyhexanoate content; a) poly(3-hydroxybutyrate-co-3-hydroxyvalerate) with a 5% to 22% 3-hydroxyvalerate content blended with b) poly(3-hydroxybutyrate-co-4-hydroxybutyrate) with a 20-50% 4-hydroxybutyrate content; a) a poly(3-hydroxybutyrate-co-3-hydroxyvalerate) with a 5% to 22% 3-hydroxyvalerate content blended with b) a poly(3-hydroxybutyrate-co-5-hydroxyvalerate) with a 20% to 50% 5-hydroxyvalerate content; a) a poly(3-hydroxybutyrate-co-3-hydroxyvalerate) with a 5% to 22% 3-hydroxyvalerate content blended with b) a poly(3-hydroxybutyrate-co-3-hydroxyhexanoate) having a 5%-50% 3-hydroxyhexanoate content; a) a poly(3-hydroxybutyrate-co-3-hydroxyhexanoate) with a 3% to 15% 3-hydroxyhexanoate content blended with b) a poly(3-hydroxybutyrate-co-4-hydroxybutyrate) with a 20-50% 4-hydroxybutyrate content; a) a poly(3-hydroxybutyrate-co-3-hydroxyhexanoate) with a 3% to 15% 3-hydroxyhexanoate content blended with b) a poly(3-hydroxybutyrate-co-5-hydroxyvalerate) with a 20% to 50% 5-hydroxyvalerate; or a) a poly(3-hydroxybutyrate-co-3-hydroxyhexanoate) with a 3% to 15% 3-hydroxyhexanoate content blended with b) a poly(3-hydroxybutyrate-co-3-hydroxyhexanoate) having a 5%-50% 3-hydroxyhexanoate content; a) a poly(3-hydroxybutyrate) homopolymer blended with b) a poly(3-hydroxybutyrate-co-4-hydroxybutyrate) with a 20-50% 4-hydroxybutyrate content and the weight of polymer a) can be 5% to 95% of the combined weight of polymer a) and polymer b); a) a poly(3-hydroxybutyrate) homopolymer blended with b) a poly(3-hydroxybutyrate-co-3-hydroxyvalerate) with a 20% to 50% 5-hydroxyvalerate content and the weight of polymer a) can be 5% to 95% of the combined weight of polymer a) and polymer b); a) a poly(3-hydroxybutyrate) homopolymer blended with b) a poly(3-hydroxybutyrate-co-3-hydroxyhexanoate) having a 5%-50% 3-hydroxyhexanoate content and the weight of polymer a) can be 5% to 95% of the combined weight of polymer a) and polymer b); a) a poly(3-hydroxybutyrate-co-4-hydroxybutyrate) with a 5% to 15% 4-hydroxybutyrate content blended with b) poly(3-hydroxybutyrate-co-4-hydroxybutyrate) with a 20-50% 4-hydroxybutyrate content and the weight of polymer a) is 5% to 95% of the combined weight of polymer a) and polymer b); a) a poly(3-hydroxybutyrate-co-4-hydroxybutyrate) with a 5% to 15% 4-hydroxybutyrate content blended with b) poly(3-hydroxybutyrate-co-5-hydroxyvalerate) with a 20% to 50% 5-hydroxyvalerate and the weight of polymer a) can be 5% to 95% of the combined weight of polymer a) and polymer b); a) a poly(3-hydroxybutyrate-co-4-hydroxybutyrate) with a 5% to 15% 4-hydroxybutyrate content blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b); a) a poly(3-hydroxybutyrate-co-3-hydroxyvalerate) with a 5% to 22% 3-hydroxyvalerate content blended with b) poly(3-hydroxybutyrate-co-4-hydroxybutyrate) with a 20-50% 4-hydroxybutyrate content and the weight of polymer a) is 5% to 95% of the combined weight of polymer a) and polymer b); a) a poly(3-hydroxybutyrate-co-3-hydroxyvalerate) with a 5% to 22% 3-hydroxyvalerate content blended with b) a poly(3-hydroxybutyrate-co-5-hydroxyvalerate) with a 20% to 50% 5-hydroxyvalerate and the weight of polymer a) can be 5% to 95% of the combined weight of polymer a) and polymer b); a) a poly(3-hydroxybutyrate-co-3-hydroxyvalerate) with a 5% to 22% 3-hydroxyvalerate content blended with b) a poly(3-hydroxybutyrate-co-3-hydroxyhexanoate) having a 5%-50% 3-hydroxyhexanoate content and the weight of polymer a) can be 5% to 95% of the combined weight of polymer a) and polymer b); a) a poly(3-hydroxybutyrate-co-3-hydroxyhexanoate) with a 3% to 15% 3-hydroxyhexanoate content blended with b) a poly(3-hydroxybutyrate-co-4-hydroxybutyrate) with a 20-50% 4-hydroxybutyrate content and the weight of polymer a) can be 5% to 95% of the combined weight of polymer a) and polymer b); a) a poly(3-hydroxybutyrate-co-3-hydroxyhexanoate) with a 3% to 15% 3-hydroxyhexanoate content blended with b) a poly(3-hydroxybutyrate-co-5-hydroxyvalerate) with a 20% to 50% 5-hydroxyvalerate and the weight of polymer a) can be 5% to 95% of the combined weight of polymer a) and polymer b); or a) a poly(3-hydroxybutyrate-co-3-hydroxyhexanoate) with a 3% to 15% 3-hydroxyhexanoate content blended with b) a poly(3-hydroxybutyrate-co-3-hydroxyhexanoate) having a 5%-50% 3-hydroxyhexanoate content and the weight of polymer a) can be 5% to 95% of the combined weight of polymer a) and polymer b), wherein the composition comprises 20 to 60% of the combined weight of polymer a) and polymer b) and the weight of polymer b can be 40% to 80% of the combined weight of polymer a) and polymer b).

In other embodiments, polymer a) and polymer b) of the PHA composition are further blended with polymer c) a poly(3-hydroxybutyrate-co-4-hydroxybutyrate) with a 20% to 50% 4-hydroxybutyrate content, c) a poly(3-hydroxybutyrate-co-5-hydroxyvalerate) with a 20% to 50% 5-hydroxyvalerate content or with c) a poly(3-hydroxybutyrate-co-3-hydroxyhexanoate) with a 5% to 50% 3-hydroxyhexanoate content.

In the embodiments of the invention, the PHA for use in the compositions does not include 100% PLA, 100% P3HB or poly-3-hydroxybutyrate-co-3-polyhydroxyvalerate (isodimorphic).

The composition of any of the embodiments or aspects described herein, further comprising at least one thermal stabilizer, co-stabilizer, plasticizer or antioxidant.

In any of the embodiments or aspects above, the composition comprises a polymer blend of a polyvinyl chloride (PVC) polymer and a biobased non-extractable nonvolatile plasticizing polyhydroxyalkanoate copolymer or blend thereof (PHA), wherein the PHA includes a 3-polyhydroxybutylrate-co-4-polyhydroxybutyrate copolymer and improves performance of the PVC polymer blend. The copolymer is a multiphase copolymer blend of PHA, having an amorphous rubber phase with a $T_g$ between about −15° C. and about −45° C. and is between about 5 weight % to about 45 weight % of the total PHA in the composition having least two phases, for example, the multiphase copolymer blend includes a poly-3-hydroxybutylrate-co-4-polyhydroxybutyrate copolymer and a poly-3-hyroxybutyrate homopolymer and optionally contains 11% 4HB content of the total PHA and optionally branched or crosslinked, branched by a peroxide and a co-agent additionally the PHA/PVC blend includes a plasticizer, a barium/zinc stabilizer and an epoxidized soybean oil and in some embodiments, the plasticizer is diisononyl adipate.

In a further aspect of the invention, the composition includes a polymer blend of a polyvinyl chloride (PVC) polymer and a biobased non-extractable nonvolatile plasticizing polyhydroxyalkanoate polymer, copolymer or blend thereof (PHA), wherein the copolymer is a multiphase PHA copolymer blend, having an amorphous rubber phase with a $T_g$ between about −15° C. and about −45° C. and is between about 5 weight % to about 45 weight % of the total PHA in the composition which optionally has a poly-3-hydroxybutylrate-co-4-polyhydroxybutyrate copolymer having 11% 4HB content and optionally a poly-3-hydroxybutyrate homopolymer branched or crosslinked, by a peroxide and a co-agent, containing the plasticizer diisononyl adipate, a barium/zinc stabilizer and epoxidized soybean oil.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
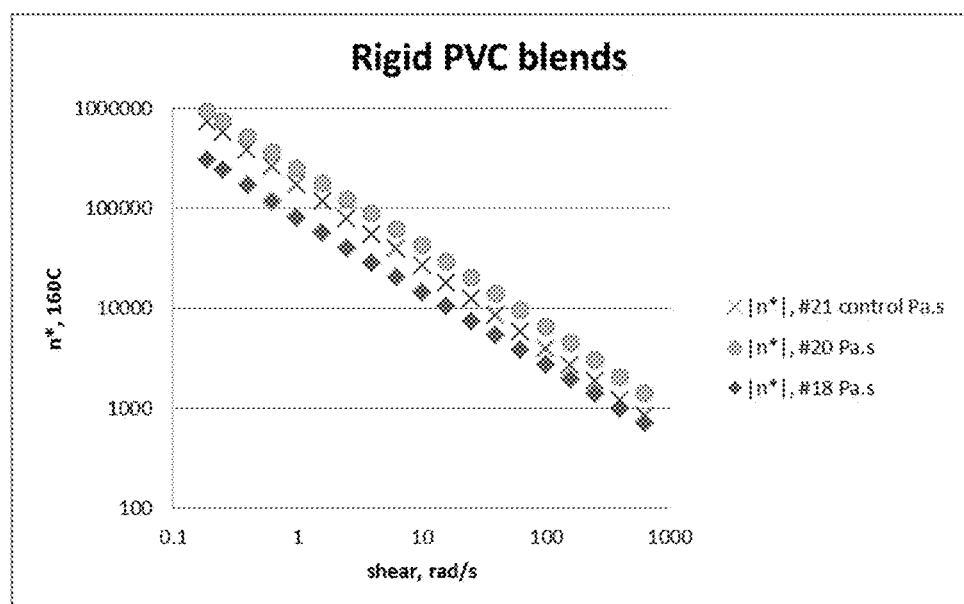
FIG. 1 is a plot showing melt viscosity vs. shear rate plot @160° C. for PVC with 18 phr DIDP plasticizer (control sample 21—crosses); PVC with 10 phr KANE ACE™ B22 impact modifier and 18 phr DIDP (sample 18—diamonds); PVC with 28 phr PHA E no DIDP (sample 20—circles).

A description of example embodiments of the invention follows.

Polymer blend compositions of polyvinyl chloride (PVC) and polyhydroxyalkanoates (PHAs) having improved mechanical properties (impact and tear strength), UV, thermal and oxidative stability, fungal resistance and improved processability (melt flow) are described. In one aspect of the invention, the composition is a polymer blend of a polyvinyl chloride (PVC) polymer and a biobased non-extractable non-volatile plasticizing polyhydroxyalkanoate polymer, copolymer or blend thereof (PHA). The PHA improves the mechanical performance and properties of rigid to flexible PVC such as: plasticization, impact strength, tear strength, UV and thermal stability, optical clarity and melt stability and in some circumstances improves the application ranges for PVC materials. For example, the PHA component improves impact properties (e.g., strength, durability, breakability), the PHA is a non-extractible non-volatile plasticizing PHA (e.g., the PHA imparts more efficient plasticization than the traditional plasticizers, and it's not volatile so there is no leaching or reduction of the plasticizing effect. Further, the PHA imparts an expanded process window (e.g., in some circumstances from miscibility and crystallinity properties of the PHA).

Surprisingly, it was found that the PHA compositions when added to the PVC provide low temperature flexibility even at high molecular weights and allow the compositions to have a broader range of applications. Traditional plasticizers decrease the low-temperature performance of PVC compounds with increasing polarity or increased viscosity of the plasticizer (see Plastics Additives Handbook, 4$^{th}$ Ed., Edited by Gachter and Muller, Hanser/Gardner Publications, Inc., Cincinnati, Ohio, 1993). Unexpectedly it has been found that high molecular weight PHA copolymers or copolymer blends improves the low temperature flexibility of PVC. "Non-extractable" refers to the inability of the PHA to be removed from the PVC/PHA blend by contact with a solvent, exposure to high heat or even by molecular diffusion out of the blend as most plasticizers are prone to at room temperature or use conditions. Thus, the plasticizer remains in the composition and is "permanent."

It has also been found that when the PHA is branched or crosslinked by reactive extrusion prior to addition to rigid PVC, the PHA greatly improves the impact strength of the rigid PVC without causing a significant decrease in other properties such as tensile strength, modulus, dimensional stability and die swell as is typically observed when other impact modifiers are utilized. For example, an improvement in Notched Izod Impact strength can be observed in branched PHA/PVC blends of 30%, 40%, 50%, 60% or 70% greater as compared to non-crosslinked PHA/PVC blends.

The PHAs themselves include homopolymers (excluding poly-3-hydroxybutyrate at 100% of the composition), copolymers (excluding poly 3-hydroxybutyrate-3-hydroxyvalerate at 100%) or blended PHAs. The fully amorphous PHAs (having low percent crystallinity (<10%) and sometimes no observed melting point temperature) have properties that are consistent with rubbery polymers where they are extremely flexible at room temperature. The mostly amorphous or rubber phase PHAs includes polymers and copolymers of 4-hydroxybutyrate, 3-hydroxyhexanoate, 6-hydroxyhexanoate, 5-hydroxyvalerate or 3-hydroxyoctanoate, and combinations thereof but do not include only 100% P3HB or P3HB-co-3HV which are included in certain embodiments. The resultant PHA for combining with the PVC resins may be a blend, copolymer, mixture or combination of one, two or three or more PHA components wherein one of the components is an amorphous or rubbery phase material. The crystallinity of polymers, which fundamentally affects all of its physical properties, can be measured using a number of techniques such as differential scanning calorimetry (DSC), dynamic mechanical analysis (DMA), X-ray diffraction (XRD) or overall density. For the DSC method, a sample of unknown crystallinity is first thermally condition and then heated in the DSC beyond its melting point. The data obtained from the DSC on the sample is heat flow vs. temperature. The heat of melting ($\Delta H_m$) is then measured (J/g) by integrating the area under the melting peak for the sample. To obtain the percent crystallinity of the unknown sample, its heat of melting is divided by the heat melting for the same or similar material of known crystallinity (values are published in the literature) and multiplied by 100%. This value then is an estimate of the percent crystallinity of the unknown material.

Pure P4HB homopolymer is a fully flexible (mostly amorphous), rubbery polymer at room temperature with a significantly lower glass transition temperature ($T_g$=−48 to −43° C.) than that of pure P3HB ($T_g$=12 to 15° C.). When it is combined with 3-hydroxybutyrate in a copolymer, where the %4HB>25% by weight, the copolymer retains its rubbery properties ($T_g$=−15° C. to −45° C.) as described by C. Cong et. al., *Journal of Applied Polymer Science*, vol. 109, p 1962, 2008. If the rubbery PHA copolymer is blended with other polymers, it readily forms a separate rubbery phase which imparts a toughening effect on the overall polymer blend. Because of this property and its proven biodegradability in various environments, it is a beneficial material for improving the toughness, tear and impact properties of PVC polymer resins.

The PVCs tensile properties are modified by blending with the PHAs. Combining (e.g., mixing or blending) the PVC and PHA provides the following benefits compared to PVC without PHA including but not limited to: (1) higher tensile elongation (2) higher tensile toughness (3) improved thermal stability and/or better melt strength (PHA helps to maintain the PVC's molecular weight and prevents cross-linking reactions from occurring) and (4) better melt flow properties (e.g. decreases PVC melt viscosity and promotes faster fusion of PVC particles without the need for processing aids) resulting in a broader processing window for the overall composition and subsequent applications of these compositions in production of articles, films and the like.

The temperatures experienced by a polymer during processing can cause a drop in melt strength due to thermal degradation, which can in turn cause difficulties in processing the polymer(s). Increased melt strength is therefore useful in that it allows the polymers to be processed across a broader temperature range. A broader "processing window" is especially beneficial in certain polymer applications, such as in the production of blown film (i.e., in preventing or reducing bubble collapse), or cast film extrusion, thermoformed articles (i.e., preventing or reducing sheet sag during thermoforming), profile extruded articles (i.e., preventing or reducing sag), non-woven fibers, monofilament, etc. Additionally, articles made from the compositions described herein exhibit greater tensile toughness and elongation while maintaining biodegradability. The increases in tensile toughness can be 10 to 40 fold greater. The increases in elongation can be 10 to 60 fold greater. Tensile toughness increase can be 10-20, 20-30 or 25-35 fold. Elongation increase can be 20-30, 30-40 or 45-60 fold.

Increased melt strength is useful in that it allows the PVC polymers to be formed over a broader temperature range during thermal processing. PVC processing at the typical temperatures (165° C.) can sometimes be difficult due to the slow melting and fusion rates of the PVC resin particles. PVC/PHA films made from the methods and compositions described herein additionally showed greater tensile strength, tear resistance, greater puncture resistance higher UV or photostability and resistance to fungal growth.

The films produced by the compositions described herein can also be used to make laminates. The biodegradable laminates comprising the compositions of the invention are suitable for coating other layers such as paper to produce articles or containers. The laminate is produced for example by co-extruding a composition of the invention onto a paper layer or with another thermoplastic blend or composition. Other layers of thermoplastic polymers or additional layers of a composition of the invention can also be included or stacked to form laminates. For example, adhesive layers can also be added or other polymer layers that impart particular desired properties. For example, the blended materials or laminates can be different and improved by varying compositions to change the degree of hardness, softness, flexibility, tackiness, toughness, ductility, processability, opaqueness and the like. Additives, such as inorganic fillers, anti-blocking agents, plasticizers and the like are also contemplated. The plasticizers can be made from petroleum-based starting materials or from renewable starting materials. Examples of plasticizers made from renewable starting materials are the levulinic acid esters (Segetis), epoxidized soybean oil and other modified plant oils and succinate esters (BioAmber) to name a few.

In certain aspects, the laminate can be 1 to 15 layers, for example 2 layers, 3 layers, 4 layers or 5 layers, 6 layers, 7 layers, 8 layers, 10 layers, 11 layers, 12 layers, 13 layers, 14 layers or 15 layers. The overall size of the laminate is about 10 microns to about 100 microns, for example 10-50 microns, 20-60 microns, 25-75 microns. Each individual layer can be about 1 to about 2 microns, for example about 1 to about 5 micron, about 2 to about 4 microns, about 2 to about 5 microns. For each laminate, at least one layer is a composition of the invention, for example, the composition of the first, second, third or fourth aspect of the invention. In certain embodiments, the compositions of the invention comprise more than one layer, for example two, three, four or more.

The methods and branched compositions of the invention also improve the melt strength of PHA polymer component, a desirable property for many polymer product applications. Melt strength is a rheological property that can be measured a number of ways. One measure is G' where G' is the polymer storage modulus measured by rotational rheometry at melt processing temperatures.

As used herein, amorphous refers to the state of the PHA which is not crystalline, for example, no lattice structure characteristic of a crystalline state. The degree of crystallinity for the invention described herein is the fraction of the polymer that exists in an orderly state, having a lattice structure. In certain embodiments, one phase of the multiphase PHA is between about 0 to about 5% crystallinity, for example the degree of crystallinity in percent is about 0, or is minimally observed to be less than about 1%. In a preferred embodiment, the degree of crystallinity of one phase of the multiphase PHA is below 3%, for example, below 2% or below 1% or ranges or numbers calculated between these percentages such as 2.5%. The degree of crystallinity calculated for the compositions of the invention is minimal and can be determined by various methods, for example, density calculations, x-ray and electron diffraction, differential scanning calorimetry, infrared absorption (FTIR), Raman spectroscopy and the like.

$T_g$ is the glass transition temperature or the glass-rubber transition temperature. It is defined as the temperature where the polymer chains begin coordinated molecular motions. Physically, the polymer modulus begins to drop several orders of magnitude until the polymer finally reaches a rubbery state.

Physical properties and rheological properties of polymeric materials depend on the molecular weight and distribution of the polymer. "Molecular weight" is calculated in a number of different ways. Unless otherwise indicated, "molecular weight" refers to weight average molecular weight.

"Number average molecular weight" ($M_n$) represents the arithmetic mean of the distribution, and is the sum of the products of the molecular weights of each fraction, multiplied by its mole fraction ($\Sigma N_i M_i / \Sigma N_i$).

"Weight average molecular weight" ($M_w$) is the sum of the products of the molecular weight of each fraction, multiplied by its weight fraction ($\Sigma N_i M_i^2 / \Sigma N_i M_i$). $M_w$ is generally greater than or equal to $M_n$.

The weight average molecular weight of the PHA amorphous rubber phase or the rubber phase of the multiphase PHA used in the compositions of the invention ranges between about 100,000 to about 2.5 million as measured by light scattering and GPC with polystyrene standards. In certain embodiments, the average molecular weight is about 50,000; about 100,000; about 125,000; about 150,000; about 175,000, about 200,000, about 250,000, about 3000,000, about 400,000, about 500,000, about 600,000, about 700,000, about 800,000, about 900,000, about 1,000,000, about 1,200,000, about 1,300,000, about 1,400,000, about 1,500,000, about 1,600,000, about 1,700,000, about 1,800,000, about 1,900,000 about 2,000,000 about 2,100,000 about 2,200,000 about 2,300,000, about 2,400,000 about 2,500,000 g/mole.

All numeric values herein can be modified by the tem "about," whether or not explicitly indicated. The term "about" generally refers to a range of numbers that one of skill in the art would consider equivalent to the recited value (i.e., having the same function or result). In some versions the term "about" refers to ±10% of the stated value, in other versions the term "about" refers to 12% of the stated value.

Polyvinyl Chloride (PVC)

Polyvinylchloride (PVC) is a versatile, thermoplastic polymer that is currently used in the production of hundreds of consumer products encompassing such diverse commercial markets as construction, electronics, healthcare, and other applications. At the global level, demand for PVC well exceeds 35 million tons per year making it the third largest volume thermoplastic behind polyethylene and polypropylene. The reason polyvinylchloride is so widely used to manufacture products is due to a combination of its low cost, versatility and desirable material properties. Notable material properties include excellent resistance to acids, bases, aliphatic hydrocarbon solvents, oils, and oxidizing agents; good flame retardancy (self-extinguishing); good weatherability especially when suitable additives are incorporated (stabile to ozone and UV exposure); good insulating properties for low frequency electrical systems; good low temperature mechanical properties and PVC products generally have long life with concomitantly low maintenance costs.

The versatility of PVC is due in part to its ability to accept large amounts of additives or fillers which alter its material properties considerably leading to a wide variety of applications. It therefore can be fabricated efficiently by calendaring, extrusion or coating into a very wide range of rigid, semi-rigid and flexible products. The rigidity of PVC can be quantified by measuring the modulus (flexural or tensile) or by measuring the hardness which is an indication of the resistance of the material to permanent deformation. There are several hardness scales such as Rockwell (R, L, M, E and K), Durometer (Shore A and D) and Barcol. The Shore D (ASTM D2240) hardness test consists of an indentor which is pressed into a flat ¼ inch thick sample while the material hardness is read from a gauge (no units) attached to the indentor. The higher the hardness value, the more rigid and stiff a material is. While no one hardness test can characterize all flexible to stiff materials, it can be generally stated that Shore D hardness values of >65 reflect materials that are rigid while values<60 reflect materials that are soft and flexible. The additives that are incorporated into PVC the most by far are plasticizers which generally impart "rubber-like" properties to the PVC by lowering the glass transition temperature ($T_g$). Plasticizers also impart low temperature resistance to embrittlement or mechanical fracture. The compatibility or miscibility of a plasticizer with a given polymer is its most beneficial property whereby high "compatibility" means a homogenous mixture of a plasticizer and polymer having optimum material properties. It should be noted that other additives such as heat stabilizers, UV stabilizers, impact modifiers and processing aids are also beneficial for optimizing the performance of PVC formulations.

The most common plasticizers used to date to improve the flexibility of PVC have been phthalates. Other types of plasticizers such as phosphates, adipates, azelates and sebacates are also utilized to improve the flexibility of polyvinylchloride especially at low temperatures. More recently, PVC compounders have been evaluating biobased plasticizers as an alternative to the petroleum-derived plasticizers in order to minimize the impact on the environment both during production of the plasticizer and end-of-life degradation of PVC products. Typical biobased PVC plasticizers include trialkyl trimellitate esters, vegetable-based esters such as hydrogenated castor oil, succinates and levulinic acid esters. The major shortcoming of a number of these plasticizers, both petroleum-derived and biobased are that they are low molecular weight compounds which can be extracted or even lost through volatilization from PVC especially in elevated temperature applications. Loss of the plasticizer over time leads to stiffening, embrittlement and ultimately failure of the PVC part.

For rigid PVC, the addition of impact modifiers aids to improve and extend its material properties for various product applications. The most effective PVC impact modifiers are preformed core shell particles made by graft polymerization of acrylates or methacrylates with butadiene rubber and styrene (acrylate-butadiene-styrene (ABS) and methacrylate-butadiene-styrene (MBS) impact modifiers). Due to the presence of the butadiene rubber, these modifiers however are prone to fast oxidation and photodegradation in air (poor UV resistance which causes yellowing of the PVC products). As such they find limited use in outdoors applications. To formulate impact resistant PVC articles for outdoors, other groups of impact modifiers were created. The most commercially important ones are the acrylic modifiers including acrylonitrile-styrene-acrylate (ASA), and copolymers of acrylates and styrenics and chlorinated polyethylene (CPE) modifiers. Unfortunately, these modifiers cannot match the impact performance of butadiene containing terpolymers. It is desirable for rigid PVC compounds to exhibit both high stiffness (high flexural modulus) and high notched impact resistance. However, commercially available PVC impact modifiers do not impart all of the desired properties including weatherability and UV stability.

Pure polyvinyl chloride without any plasticizer is a white, brittle solid and is made by polymerization of the chloroethene monomer. The polymerization reaction used to prepare polyvinylchloride (PVC) is shown below:

A number of different processes can be used to prepare the polymer including emulsion, suspension and bulk polymerization methods. PVC is available in several different forms including solid, water-based emulsions (latex) or solids suspensions in plasticizers (plastisols). Producers of PVC materials include but are not limited to Dupont (ELVAX™ PVC), Shell (Carina™ PVC), Wacker (VIRMOL™ PVC) and Sumitomo (SUMILIT™ PVC).

Solid PVC resins are often characterized by a K value. This is a number calculated from dilute solution viscosity measurements of a polymer, used to denote degree of polymerization or molecular size. The formula for calculating the PVC K value is given as:

$$\frac{\log(N_S/N_0)}{c} = \frac{75 \text{ K}^2}{1 + 1.5 \text{ Kc}} + \text{K}$$

where:
$N_S$=viscosity of the solution
$N_0$=viscosity of the solvent
c=concentration in grams per ml
The higher the K value, the higher the molecular weight of the PVC resin and the melt viscosity.

Thermal Stability of PVC

Even though polyvinylchloride has been one of the most important polymeric materials over the past few decades, it is well known that PVC has the disadvantage of having relatively low thermal stability. Thermal stability in general relates to the process whereby through high temperature, high pressure, oxidation or mechanical stress, the long chains of a polymer begins to break and react with one another thereby changing the properties of the polymer. Since thermoplastic materials are usually formed into products by the application of heat, pressure and/or mechanical stress, degradation can pose a serious problem for product performance.

For PVC, it is known that thermal degradation begins to occur at about 190° C. and initially involves the stripping off of hydrogen chloride (dehydrochlorination) with the concomitant formation of conjugated double bonds or polyene sequences leading to discoloration of the polymer. The polyene sequences can further react to form either crosslinks or cyclize to form benzene and toluene volatiles. In the presence of oxygen, oxidation reactions can also occur leading to chain scission and molecular weight reduction. Thermal degradation thus causes both chemical and physical changes, which then lead to some problems due to PVC's reduced performance.

It has been found that the initiation of dehydrochlorination in PVC occurs simultaneously on multiple positions along the polyvinylchloride backbone chain where allyl chloride structures exist. These chlorine atoms which are adjacent to double bonds are more thermally labile than the corresponding hydrogen atoms and are therefore easily lost at high temperatures. Once hydrogen chloride (HCl) is formed by this reaction, the HCl released acts to accelerate the thermal degradation process of the PVC polymer. To prevent thermal degradation from occurring in polyvinylchlorides, additives such as organotin mercaptides/sulfides or metal carboxylates are usually added. The metal carboxylates are mixtures based on salts of aliphatic (oleic) or aromatic (alkylbenzoic) carboxylic acids usually with combinations of barium/zinc or calcium/zinc metals. These additives improve thermal stability by acting directly at the dehydrochlorination initation site and/or by reacting with the free HCl generated. In the case of the metal carboxylates, reaction with HCl produces chloride salts which can also have a destabilizing effect on the PVC. Therefore co-stabilizers such as polyols, phosphites and epoxy plasticizers are often used along with the metal carboxylates to improve initial color, transparency and long term PVC stability.

For semi-rigid and flexible polyvinylchlorides, plasticizer's are also a major component of the overall product formulation. It has been found that plasticizer type, concentration and oxidative stability (formation of peroxide radicals) all affect the thermal stability of PVC. Studies on the influence of plasticizers on PVC thermal stability have suggested that solvation of the PVC chains by the plasticizer can have a positive thermal stabilizing effect on the PVC polymer (D. Braun, "*Thermal Degradation of Polyvinyl-Chloride*" in Developments in Polymer Degradation, 1981; M. Semsarzadeh et. al., *Iranian Polymer Journal*, vol. 14, No 9, 769 (2005)).

Measurement of the thermal stability of PVC has been carried out by a variety of techniques. These are based on changes in color on heating PVC test sheets (static heat test), temperature at which first weight loss for PVC occurs on heating (dynamic heat test) or the time to detect HCl when PVC is heated. For the dynamic heat test, Thermogravimetric Analysis (TGA) can be carried out on a PVC sample where by the sample is heated under a nitrogen or oxygen atmosphere while the % weight loss versus temperature is recorded. Using TGA, the temperature at which thermal degradation starts is defined either as the point at which catastrophic weight loss starts occurring ($T_{onset}$), or the temperature where the percent weight loss reaches 1% or 5% of the initial sample weight. The more thermally stable the PVC sample, the higher the temperature where degradation is measured to start.

Polyhydroxyalkanoates (PHAs)

Polyhydroxyalkanoates (PHA's) are biological polyesters synthesized by a broad range of natural and genetically engineered bacteria as well as genetically engineered plant crops (Braunegg et al., (1998), *J. Biotechnology* 65:127-161; Madison and Huisman, 1999, *Microbiology and Molecular Biology Reviews*, 63:21-53; Poirier, 2002, *Progress in Lipid Research* 41:131-155). These polymers are biodegradable thermoplastic materials, produced from renewable resources, with the potential for use in a broad range of industrial applications (Williams & Peoples, *CHEMTECH* 26:38-44 (1996)).

Useful microbial strains for producing PHAs, include *Alcaligenes eutrophus* (renamed as *Ralstonia eutropha*), *Alcaligenes latus, Azotobacter, Aeromonas, Comamonas, Pseudomonads*, and genetically engineered organisms including genetically engineered microbes such as *Pseudomonas, Ralstonia* and *Escherichia coli*.

In general, a PHA is formed by enzymatic polymerization of one or more monomer units inside a living cell. Over 100 different types of monomers have been incorporated into the PHA polymers (Steinbuchel and Valentin, 1995, *FEMS Microbiol. Lett.* 128:219-228. Examples of monomer units incorporated in PHAs for this invention include 2-hydroxybutyrate, glycolic acid, 3-hydroxybutyrate (hereinafter referred to as 3HB), 3-hydroxypropionate (hereinafter referred to as 3HP), 3-hydroxyvalerate (hereinafter referred to as 3HV), 3-hydroxyhexanoate (hereinafter referred to as 3HH), 3-hydroxyheptanoate (hereinafter referred to as 3HH), 3-hydroxyoctanoate (hereinafter referred to as 3HO), 3-hydroxynonanoate (hereinafter referred to as 3HN), 3-hydroxydecanoate (hereinafter referred to as 3HD), 3-hydroxydodecanoate (hereinafter referred to as 3HDd), 4-hydroxybutyrate (hereinafter referred to as 4HB), 4-hydroxyvalerate (hereinafter referred to as 4HV), 5-hydroxyvalerate (hereinafter referred to as 5HV), and 6-hydroxyhexanoate (hereinafter referred to as 6HH). 3-hydroxyacid monomers incorporated into PHAs are the (D) or (R) 3-hydroxyacid isomer with the exception of 3HP which does not have a chiral center. For compositions included herein, the PHA composition does not include poly(lactic acid).

In some embodiments, the PHA in the methods described herein is a homopolymer (where all monomer units are the same). Examples of PHA homopolymers include poly 3-hydroxyalkanoates (e.g., poly 3-hydroxypropionate (hereinafter referred to as P3HP), poly 3-hydroxybutyrate (hereinafter referred to as P3HB) and poly 3-hydroxyvalerate), poly 4-hydroxyalkanoates (e.g., poly 4-hydroxybutyrate (hereinafter referred to as P4HB), or poly 4-hydroxyvalerate (hereinafter referred to as P4HV)) and poly 5-hydroxyalkanoates (e.g., poly 5-hydroxyvalerate (hereinafter referred to as P5HV)).

In certain embodiments, the starting PHA can be a copolymer (containing two or more different monomer units) in which the different monomers are randomly distributed in the polymer chain. Examples of PHA copolymers include poly 3-hydroxybutyrate-co-3-hydroxypropionate (hereinafter referred to as PHB3HP), poly 3-hydroxybutyrate-co-4-hydroxybutyrate (hereinafter referred to as P3HB4HB), poly 3-hydroxybutyrate-co-4-hydroxyvalerate (hereinafter referred to as PHB4HV), poly 3-hydroxybutyrate-co-3-hydroxyvalerate (hereinafter referred to as PHB3HV), poly 3-hydroxybutyrate-co-3-hydroxyhexanoate (hereinafter referred to as PHB3HH) and poly 3-hydroxybutyrate-co-5-hydroxyvalerate (hereinafter referred to as PHB5HV).

By selecting the monomer types and controlling the ratios of the monomer units in a given PHA copolymer a wide range of material properties can be achieved. Although examples of PHA copolymers having two different monomer units have been provided, the PHA can have more than two different monomer units (e.g., three different monomer units, four different monomer units, five different monomer units, six different monomer units) An example of a PHA having 4 different monomer units would be PHB-co-3HH-co-3HO-co-3HD or PHB-co-3-HO-co-3HD-co-3HDd (these types of PHA copolymers are hereinafter referred to as PHB3HX). Typically where the PHB3HX has 3 or more monomer units the 3HB monomer is at least 70% by weight of the total monomers, preferably 85% by weight of the total monomers, most preferably greater than 90% by weight of the total monomers for example 92%, 93%, 94%, 95%, 96% by weight of the copolymer and the HX comprises one or more monomers selected from 3HH, 3HO, 3HD, 3HDd.

The homopolymer (where all monomer units are identical) P3HB and 3-hydroxybutyrate copolymers (P3HB3HP, P3HB4HB, P3HB3HV, P3HB4HV, P3HB5HV, P3HB3HHP, hereinafter referred to as PHB copolymers) containing 3-hydroxybutyrate and at least one other monomer are of particular interest for commercial production and applications. It is useful to describe these copolymers by reference to their material properties as follows. Type 1 PHB copolymers typically have a glass transition temperature (Tg) in the range of 6° C. to −10° C., and a melting temperature $T_m$ of between 80° C. to 180° C. Type 2 PHB copolymers typically have a Tg of −20° C. to −50° C. and Tm of 55° C. to 90° C. In particular embodiments, the Type 2 copolymer has a mostly amorphous phase with a $T_g$ of −15° C. to −45° C.

Preferred Type 1 PHB copolymers have two monomer units with a majority of their monomer units being 3-hydroxybutyrate monomer by weight in the copolymer, for example, greater than 78% 3-hydroxybutyrate monomer. Preferred PHB copolymers for this invention are biologically produced from renewable resources and are selected from the following group of PHB copolymers:

PHB3HV is a Type 1 PHB copolymer where the 3HV content is in the range of 3% to 22% by weight of the polymer and preferably in the range of 4% to 15% by weight of the copolymer for example: 4% 3HV; 5% 3HV; 6% 3HV; 7% 3HV; 8% 3HV; 9% 3HV; 10% 3HV; 11% 3HV; 12% 3HV; 13% 3HV; 14% 3HV; 15% 3HV;

PHB3HP is a Type 1 PHB copolymer where the 3HP content is in the range of 3% to 15% by weight of the copolymer and preferably in the range of 4% to 15% by weight of the copolymer for example: 4% 3HP; 5% 3HP; 6% 3HP; 7% 3HP; 8% 3HP; 9% 3HP; 10% 3HP; 11% 3HP; 12% 3HP. 13% 3HP; 14% 3HP; 15% 3HP.

PHB4HB is a Type 1 PHB copolymer where the 4HB content is in the range of 3% to 15% by weight of the copolymer and preferably in the range of 4% to 15% by weight of the copolymer for example: 4% 4HB; 5% 4HB; 6% 4HB; 7% 4HB; 8% 4HB; 9% 4HB; 10% 4HB; 11% 4HB; 12% 4HB; 13% 4HB; 14% 4HB; 15% 4HB.

PHB4HV is a Type 1 PHB copolymer where the 4HV content is in the range of 3% to 15% by weight of the copolymer and preferably in the range of 4% to 15% by weight of the copolymer for example: 4% 4HV; 5% 4HV; 6% 4HV; 7% 4HV; 8% 4HV; 9% 4HV; 10% 4HV; 11% 4HV; 12% 4HV; 13% 4HV; 14% 4HV; 15% 4llV.

PHB5HV is a Type 1 PHB copolymer where the 5HV content is in the range of 3% to 15% by weight of the copolymer and preferably in the range of 4% to 15% by weight of the copolymer for example: 4% 5HV; 5% 5HV; 6% 5HV; 7% 5HV; 8% 5HV; 9% 5HV; 10% 5HV; 11% 5HV; 12% 5HV; 13% 5HV; 14% 5HV; 15% 5HV.

PHB3HH is a Type 1 PHB copolymer where the 3HH content is in the range of 3% to 15% by weight of the copolymer and preferably in the range of 4% to 15% by weight of the copolymer for example: 4% 3HH; 5% 3HH; 6% 3HH; 7% 3HH; 8% 3HH; 9% 3HH; 10% 3HH; 11% 3HH; 12% 3HH; 13% 3HH; 14% 3HH; 15% 3HH;

PHB3HX is a Type 1 PHB copolymer where the 3HX content is comprised of 2 or more monomers selected from 3HH, 3HO, 3HD and 3HDd and the 3HX content is in the range of 3% to 12% by weight of the copolymer and preferably in the range of 4% to 10% by weight of the copolymer for example: 4% 3HX; 5% 3HX; 6% 3HX; 7% 3HX; 8% 3HX; 9% 3HX; 10% 3HX by weight of the copolymer.

Type 2 PHB copolymers have a 3HB content of between 80% and 5% by weight of the copolymer, for example 80%, 75%, 70%, 65%, 60%, 55%, 50%, 45%, 40%, 35%, 30%, 25%, 20%, 15%, 10%, 5% by weight of the copolymer.

PHB4HB is a Type 2 PHB copolymer where the 4HB content is in the range of 25% to 95% by weight of the copolymer and preferably in the range of 35 to 75% by weight of the copolymer for example: 25% 4HB; 30% 4HB; 35% 4HB; 40% 4HB; 45% 4HB; 50% 4HB; 60% 4HB; 70% 4HB; 80% 4HB; 90% 4HB and 95% 4HB by weight of the copolymer.

PHB5HV is a Type 2 PHB copolymer where the 5HV content is in the range of 25% to 95% by weight of the copolymer and preferably in the range of 35% to 75% by weight of the copolymer for example: 25% 5HV; 30% 5HV; 35% 5HV; 40% 5HV; 45% 5HV; 50% 5HV by weight of the copolymer.

PHB3HH is a Type 2 PHB copolymer where the 3HH is in the range of 35% to 95% by weight of the copolymer and preferably in the range of 40% to 80% by weight of the copolymer for example: 40% 3HH; 45% 3HH; 50% 3HH; 55% 3HH, 60% 3HH; 65% 3HH; 70% 3HH; 75% 3HH; 80% 3HH by weight of the copolymer.

PHB3HX is a Type 2 PHB copolymer where the 3HX content is comprised of 2 or more monomers selected from 3HH, 3HO, 3HD and 3HDd and the 3HX content is in the range of 30% to 95% by weight of the copolymer and preferably in the range of 35% to 90% by weight of the copolymer for example: 35% 3HX; 40% 3HX; 45% 3HX; 50% 3HX; 55% 3HX 60% 3HX; 65% 3HX; 70% 3HX; 75% 3HX; 80% 3HX; 85% 3HX; 90% 3HX by weight of the copolymer.

PHAs for use in the methods, compositions and pellets described in this invention are selected from: PHB or a Type 1 PHB copolymer; a PHA blend of PHB with a Type 1 PHB copolymer where the PHB content by weight of PHA in the PHA blend is in the range of 5% to 95% by weight of the PHA in the PHA blend; a PHA blend of PHB with a Type 2 PHB copolymer where the PHB content by weight of the PHA in the PHA blend is in the range of 5% to 95% by weight of the PHA in the PHA blend; a PHA blend of a Type 1 PHB copolymer with a different Type 1 PHB copolymer and where the content of the first Type 1 PHB copolymer is in the range of 5% to 95% by weight of the PHA in the PHA blend; a PHA blend of a Type 1 PHB copolymer with a Type 2 PHA copolymer where the content of the Type 1 PHB copolymer is in the range of 30% to 95% by weight of the PHA in the PHA blend; a PHA blend of PHB with a Type 1 PHB copolymer and a Type 2 PHB copolymer where the PHB content is in the range of 10% to 90% by weight of the PHA in the PHA blend, where the Type 1 PHB copolymer content is in the range of 5% to 90% by weight of the PHA in the PHA blend and where the Type 2 PHB copolymer content is in the range of 5% to 90% by weight of the PHA in the PHA blend.

The PHA blend of PHB with a Type 1 PHB copolymer is a blend of PHB with PHB3HP where the PHB content in the PHA blend is in the range of 5% to 90% by weight of the PHA in the PHA blend and the 3HP content in the PHB3HP is in the range of 7% to 15% by weight of the PHB3HP.

The PHA blend of PHB with a Type 1 PHB copolymer is a blend of PHB with PHB3HV where the PHB content of the PHA blend is in the range of 5% to 90% by weight of the PHA in the PHA blend and the 3HV content in the PHB3HV is in the range of 4% to 22% by weight of the PHB3HV.

The PHA blend of PHB with a Type 1 PHB copolymer is a blend of PHB with PHB4HB where the PHB content of the PHA blend is in the range of 5% to 90% by weight of the PHA in the PHA blend and the 4HB content in the PHB4HB is in the range of 4% to 15% by weight of the PHB4HB.

The PHA blend of PHB with a Type 1 PHB copolymer is a blend of PHB with PHB4HV where the PHB content of the PHA blend is in the range of 5% to 90% by weight of the PHA in the PHA blend and the 4HV content in the PHB4HV is in the range of 4% to 15% by weight of the PHB4HV.

The PHA blend of PHB with a Type 1 PHB copolymer is a blend of PHB with PHB5HV where the PHB content of the PHA blend is in the range of 5% to 90% by weight of the PHA in the PHA blend and the 5HV content in the PHB5HV is in the range of 4% to 15% by weight of the PHB5HV.

The PHA blend of PHB with a Type 1 PHB copolymer is a blend of PHB with PHB3HH where the PHB content of the PHA blend is in the range of 5% to 90% by weight of the PHA in the PHA blend and the 3HH content in the PHB3HH is in the range of 4% to 15% by weight of the PHB3HH.

The PHA blend of PHB with a Type 1 PHB copolymer is a blend of PHB with PHB3HX where the PHB content of the PHA blend is in the range of 5% to 90% by weight of the PHA in the PHA blend and the 3HX content in the PHB3HX is in the range of 4% to 15% by weight of the PHB3HX.

The PHA blend is a blend of a Type 1 PHB copolymer selected from the group PHB3HV, PHB3HP, PHB4HB, PHBV, PHV4HV, PHB5HV, PHB3HH and PHB3HX with a second Type 1 PHB copolymer which is different from the first Type 1 PHB copolymer and is selected from the group PHB3HV, PHB3HP, PHB4HB, PHBV, PHV4HV, PHB5HV, PHB3HH and PHB3HX where the content of the First Type 1 PHB copolymer in the PHA blend is in the range of 10% to 90% by weight of the total PHA in the blend.

The PHA blend of PHB with a Type 2 PHB copolymer is a blend of PHB with PHB4HB where the PHB content in the PHA blend is in the range of 30% to 95% by weight of the PHA in the PHA blend and the 4HB content in the PHB4HB is in the range of 20% to 60% by weight of the PHB4HB.

The PHA blend of PHB with a Type 2 PHB copolymer is a blend of PHB with PHB5HV where the PHB content in the PHA blend is in the range of 30% to 95% by weight of the PHA in the PHA blend and the 5HV content in the PHB5HV is in the range of 20% to 60% by weight of the PHB5HV.

The PHA blend of PHB with a Type 2 PHB copolymer is a blend of PHB with PHB3HH where the PHB content in the PHA blend is in the range of 35% to 95% by weight of the PHA in the PHA blend and the 3HH content in the PHB3HH is in the range of 35% to 90% by weight of the PHB3HX.

The PHA blend of PHB with a Type 2 PHB copolymer is a blend of PHB with PHB3HX where the PHB content in the PHA blend is in the range of 30% to 95% by weight of the PHA in the PHA blend and the 3HX content in the PHB3HX is in the range of 35% to 90% by weight of the PHB3HX.

The PHA blend is a blend of PHB with a Type 1 PHB copolymer and a Type 2 PHB copolymer where the PHB content in the PHA blend is in the range of 10% to 90% by weight of the PHA in the PHA blend, the Type 1 PHB copolymer content of the PHA blend is in the range of 5% to 90% by weight of the PHA in the PHA blend and the Type 2 PHB copolymer content in the PHA blend is in the range of 5% to 90% by weight of the PHA in the PHA blend.

For example, a PHA blend can have a PHB content in the PHA blend in the range of 10% to 90% by weight of the PHA in the PHA blend, a PHB3HV content in the PHA blend in the range 5% to 90% by weight of the PHA in the PHA blend, where the 3HV content in the PHB3HV is in the range of 3% to 22% by weight of the PHB3HV, and a PHBHX content in the PHA blend in the range of 5% to 90% by weight of the PHA in the PHA blend where the 3HX content in the PHBHX is in the range of 35% to 90% by weight of the PHBHX.

For example, a PHA blend can have a PHB content in the PHA blend in the range of 10% to 90% by weight of the PHA in the PHA blend, a PHB3HV content in the PHA blend in the range 5% to 90% by weight of the PHA in the PHA blend, where the 3HV content in the PHB3HV is in the range of 3% to 22% by weight of the PHB3HV, and a PHB4HB content in the PHA blend in the range of 5% to 90% by weight of the PHA in the PHA blend where the 4HB content in the PHB4HB is in the range of 20% to 60% by weight of the PHB4HB.

For example, a PHA blend can have a PHB content in the PHA blend in the range of 10% to 90% by weight of the PHA in the PHA blend, a PHB3HV content in the PHA blend in the range 5% to 90% by weight of the PHA in the PHA blend, where the 3HV content in the PHB3HV is in the range of 3% to 22% by weight of the PHB3HV, and a PHB5HV content in the PHA blend in the range of 5% to 90% by weight of the PHA in the PHA blend where the 5HV content in the PHB5HV is in the range of 20% to 60% by weight of the PHB5HV.

For example, a PHA blend can have a PHB content in the PHA blend in the range of 10% to 90% by weight of the PHA in the PHA blend, a PHB4HB content in the PHA blend in the range 5% to 90% by weight of the PHA in the PHA blend, where the 4HB content in the PHB4HB is in the range of 4% to 15% by weight of the PHB4HB, and a PHB4HB content in the PHA blend in the range of 5% to 90% by weight of the PHA in the PHA blend where the 4HB content in the PHB4HB is in the range of 20% to 60% by weight of the PHB4HB.

For example, a PHA blend can have a PHB content in the PHA blend in the range of 10% to 90% by weight of the PHA in the PHA blend, a PHB4HB content in the PHA blend in the range 5% to 90% by weight of the PHA in the PHA blend, where the 4HB content in the PHB4HB is in the range of 4% to 15% by weight of the PHB4HB, and a PHB5HV content in the PHA blend in the range of 5% to 90% by weight of the PHA in the PHA blend and where the 5HV content in the PHB5HV is in the range of 30% to 90% by weight of the PHB5HV.

For example, a PHA blend can have a PHB content in the PHA blend in the range of 10% to 90% by weight of the PHA in the PHA blend, a PHB4HB content in the PHA blend in the range 5% to 90% by weight of the PHA in the PHA blend, where the 4HB content in the PHB4HB is in the range of 4% to 15% by weight of the PHB4HB, and a PHB3HX content in the PHA blend in the range of 5% to 90% by weight of the PHA in the PHA blend and where the 3HX content in the PHB3HX is in the range of 35% to 90% by weight of the PHB3HX.

For example, a PHA blend can have a PHB content in the PHA blend in the range of 10% to 90% by weight of the PHA in the PHA blend, a PHB4HV content in the PHA blend in the range 5% to 90% by weight of the PHA in the PHA blend, where the 4HV content in the PHB4HV is in the range of 3% to 15% by weight of the PHB4HV, and a PHB5HV content in the PHA blend in the range of 5% to 90% by weight of the PHA in the PHA blend where the 5HV content in the PHB5HV is in the range of 30% to 90% by weight of the PHB5HV.

For example, a PHA blend can have a PHB content in the PHA blend in the range of 10% to 90% by weight of the PHA in the PHA blend, a PHB3HH content in the PHA blend in the range 5% to 90% by weight of the PHA in the PHA blend, where the 3HH content in the PHB3HH is in the range of 3% to 15% by weight of the PHB3HH, and a PHB4HB content in the PHA blend in the range of 5% to 90% by weight of the PHA in the PHA blend where the 4HB content in the PHB4HB is in the range of 20% to 60% by weight of the PHB4HB.

For example, a PHA blend can have a PHB content in the PHA blend in the range of 10% to 90% by weight of the PHA in the PHA blend, a PHB3HH content in the PHA blend in the range 5% to 90% by weight of the PHA in the PHA blend, where the 3HH content in the PHB3HH is in the range of 3% to 15% by weight of the PHB3HH, and a PHB5HV content in the PHA blend in the range of 5% to 90% by weight of the PHA in the PHA blend where the 5HV content in the PHB5HV is in the range of 20% to 60% by weight of the PHB5HV.

For example, a PHA blend can have a PHB content in the PHA blend in the range of 10% to 90% by weight of the PHA in the PHA blend, a PHB3HH content in the PHA blend in the range 5% to 90% by weight of the PHA in the PHA blend, where the 3HH content in the PHB3HH is in the range of 3% to 15% by weight of the PHB3HH, and a PHB3HX content in the PHA blend in the range of 5% to 90% by weight of the PHA in the PHA blend where the 3HX content in the PHB3HX is in the range of 35% to 90% by weight of the PHB3HX.

For example, a PHA blend can have a PHB content in the PHA blend in the range of 10% to 90% by weight of the PHA in the PHA blend, a PHB3HX content in the PHA blend in the range 5% to 90% by weight of the PHA in the PHA blend, where the 3HX content in the PHB3HX is in the range of 3% to 12% by weight of the PHB3HX, and a PHB3HX content in the PHA blend in the range of 5% to 90% by weight of the PHA in the PHA blend where the 3HX content in the PHB3HX is in the range of 35% to 90% by weight of the PHB3HX.

For example, a PHA blend can have a PHB content in the PHA blend in the range of 10% to 90% by weight of the PHA in the PHA blend, a PHB3HX content in the PHA blend in the range 5% to 90% by weight of the PHA in the PHA blend, where the 3HX content in the PHB3HX is in the range of 3% to 12% by weight of the PHB3HX, and a PHB4HB content in the PHA blend in the range of 5% to 90% by weight of the PHA in the PHA blend where the 4HB content in the PHB4HB is in the range of 20% to 60% by weight of the PHB4HB.

For example, a PHA blend can have a PHB content in the PHA blend in the range of 10% to 90% by weight of the PHA in the PHA blend, a PHB3HX content in the PHA blend in the range 5% to 90% by weight of the PHA in the PHA blend, where the 3HX content in the PHB3HX is in the range of 3% to 12% by weight of the PHB3HX, and a PHB5HV content in the PHA blend in the range of 5% to 90% by weight of the PHA in the PHA blend where the 5HV content in the PHB5HV is in the range of 20% to 60% by weight of the PHB5HV.

The PHA blend is a blend as disclosed in U.S. Published Application No. US 2004/0220355, by Whitehouse, published Nov. 4, 2004, which is incorporated herein by reference in its entirety.

Microbial systems for producing the PHB copolymer PHBV are disclosed in, e.g., U.S. Pat. No. 4,477,654 to Holmes, which is incorporated herein by reference in its entirety. U.S. Published Application No. US 2002/0164729 (also incorporated herein by reference in its entirety) by Skraly and Sholl describes useful systems for producing the PHB copolymer PHB4HB. Useful processes for producing the PHB copolymer PHB3HH have been described (Lee et al., 2000, *Biotechnology and Bioengineering* 67:240-244; Park et al., 2001, *Biomacromolecules* 2:248-254). Processes for producing the PHB copolymers PHB3HX have been described by Matsusaki et al. (*Biomacromolecules* 2000, 1:17-22). Genetically engineered microbial PHA production system with fast growing hosts such as *Escherichia coli* have been developed. In certain embodiments, genetic engineering also allows for the modification of wild-type microbes to improve the production of the 4HB comonomer. Examples of PHA production modification are described in Steinbuchel et. al., *FEMS Microbiol. Lett.,* 1995, 128, p 218. PCT Publication No. WO 98/04713 describes methods for controlling the molecular weight using genetic engineering to control the level of the PHA synthase enzyme. Commercially useful strains, including *Alcaligenes eutrophus* (renamed as *Ralstonia eutropha*), *Alcaligenes latus, Azotobacter vinlandii*, and *Pseudomonads* for producing PHA's are disclosed in Lee, *Biotechnology & Bioengineering,* 1994, 49:p 1 and Braunegg et. al., *J Biotechnology* 1998, 65, p 127. U.S. Pat. Nos. 6,316,262; 7,229,804; 6,759,219 and 6,689,589 describe biological systems for manufacture of PHA polymers containing 4-hydroxyacids are incorporated herein by reference. Also incorporated by reference is PCT Publication No. WO 2010/068953 which describes microbial production of poly-3-hydroxybutyrate-co-5-hydroxyvalerate copolymers.

In determining the molecular weight techniques such as gel permeation chromatography (GPC) can be used. In the methodology, a polystyrene standard is utilized. The PHA can have a polystyrene equivalent weight average molecular weight (in daltons) of at least 500, at least 10,000, or at least 50,000 and/or less than 2,000,000, less than 1,000,000, less than 1,500,000, and less than 800,000. In certain embodiments, preferably, the PHAs generally have a weight-average molecular weight in the range of 100,000 to 700,000. For example, the molecular weight range for PHB and Type 1 PHB copolymers for use in this application are in the range of 400,000 daltons to 1.5 million daltons as determined by GPC method and the molecular weight range for Type 2 PHB copolymers for use in the application 50,000 to 1.5 million daltons.

In certain embodiments, the PHA can have a linear equivalent weight average molecular weight of from about 50,000 Daltons to about 500,000 Daltons and a polydispersity index of from about 2.5 to about 8.0. As used herein, weight average molecular weight and linear equivalent weight average molecular weight are determined by gel permeation chromatography, using, e.g., chloroform as both the eluent and diluent for the PHA samples. Calibration curves for determining molecular weights are generated using linear polystyrenes as molecular weight standards and a 'log MW vs. elution volume' calibration method.

Culturing of Host to Produce PHA Biomass

In general, a recombinant host is cultured in a medium with a carbon source and other essential nutrients to produce the PHA biomass by fermentation techniques either in batches or continuously using methods known in the art. Additional additives can also be included, for example, antifoaming agents and the like for achieving desired growth conditions. Fermentation is particularly useful for large scale production. An exemplary method uses bioreactors for culturing and processing the fermentation broth to the desired product. Other techniques such as separation techniques can be combined with fermentation for large scale and/or continuous production.

As used herein, the term "feedstock" refers to a substance used as a carbon raw material in an industrial process. When used in reference to a culture of organisms such as microbial or algae organisms such as a fermentation process with cells, the term refers to the raw material used to supply a carbon or other energy source for the cells. Carbon sources useful for the production of PHA's include simple, inexpensive sources, for example, glucose, levoglucosan, sucrose, lactose, fructose, xylose, maltose, arabinose and the like alone or in combination. In other embodiments, the feedstock is molasses or starch, fatty acids, vegetable oils or a lignocellulosic material and the like. It is also possible to use organisms to produce the P4HB biomass that grow on synthesis gas ($CO_2$, CO and hydrogen) produced from renewable biomass resources and/or methane originating from landfill gas.

Introduction of particular pathway genes allows for flexibility in utilizing readily available and inexpensive feedstocks. A "renewable" feedstock refers to a renewable energy source such as material derived from living organisms or their metabolic byproducts including material derived from biomass, often consisting of underutilized components like chaff or stover. Agricultural products specifically grown for use as renewable feedstocks include, for example, corn, soybeans, switchgrass and trees such as poplar, wheat, flaxseed and rapeseed, sugar cane and palm oil. As renewable sources of energy and raw materials, agricultural feedstocks based on crops are the ultimate replacement for declining oil reserves. Plants use solar energy and carbon dioxide fixation to make thousands of complex and functional biochemicals beyond the current capability of modern synthetic chemistry. These include fine and bulk chemicals, pharmaceuticals, nutraceuticals, flavanoids, vitamins, perfumes, polymers, resins, oils, food additives, bio-colorants, adhesives, solvents, and lubricants.

Blends of PVC with PHA and Combinations Thereof

In certain embodiments, the polymers for use in the methods and compositions are blended in the presence of additives (e.g., nucleating agent(s), compatibilizer(s), thermal stabilizers, anti-slip additive(s) and the like, to form compositions with improved toughness properties. The percentages of PVC in the PVC/PHA blend are 50% to 95% by weight, for example 70-95%. In certain compositions of the invention, the percentages of PVC and PHA of the total polymer compositions ranges from about 95% PVC to about 5% PHA or about 50% PVC to about 50% PHA. For example the PVC/PHA ratio can be 95/5, 90/10, 85/15, 80/20, 75/25, 70/30, 65/35, 60/40, 55/45 or 50/50.

Thermal Stabilization of PVC/PHA Blends

The thermal degradation of PVC is governed by the following degradation reactions: dehydrochlorination, autooxidation, mechanical/chemical chain scission and crosslinking. In commercial applications, these degradation mechanisms are controlled by the addition of heat stabilizers which are commonly composed of organic salts containing Na, K, Ca, Ba or Zn metals. These thermal stabilizers could accelerate the thermal degradation of the PHA polymers themselves and therefore care must taken to choose the appropriate stabilizers which will simultaneously minimize PVC degradation but not accelerate the thermal degradation of the PHA.

At polymer melt processing conditions (170 to 210° C.), P3HB thermally degrades via random chain scission with formation of carboxyl groups and vinyl crotonate ester groups through a six-membered ring ester decomposition process. Crotonic acid could be formed as result of chain scission as well as unsaturated carbon-carbon groups. Crotonic acid being a weak acid, does not by itself accelerate P3HB degradation further. There are currently no known heat stabilizers to prevent formation of the six-membered ring followed by chain scission in P3HB. Metal salts of Na, Ca and Mg have been shown to accelerate the chain scission reaction, whereas compounds containing Zn, Sn, Al were shown to have little effect on the thermal degradation reactions (see K. J. Kim, Y. Doi, H. Abe, *Polymer Degradation and Stability*, 93 (2008), 776-785). P4HB is somewhat more thermally stable than P3HB and thermally degrades by a different mechanism.

PVC heat stabilizers which prevent the dehydro chlorination reaction include the salts of strongly or moderately basic metal cations such as Na, K, Ca, Ba, Sr, Mg, Pb. They are additionally combined with primary metal salts, such as Zn, that participate in the chlorine displacement reactions. Suitable combinations of mixed metal stabilizers include Ba/Zn or Ca/Ba/Zn which have been shown to provide good overall stabilization, initial color and long term thermal stability of PVC. The Ba/Zn cation ratios in the salt mixtures could be in the range of about 1:1 to about 10:1 and preferably of about 3:1 to about 8:1, more preferably of about 3.5:1 and 4:1 or 5:1 to 6:1. Organotin stabilizers are also applicable to the invention. Commercial heat stabilizers useful in the described invention include MARK 1984E®, MARK® 4781a (Galata Chemicals) heat stabilizer and PLASTISTAB™ 2442 (AM Stabilizers) heat stabilizer and the like.

The salt mixtures also contain an anionic group comprising two different types of carboxylic acid groups. One of the types consists of one or more anions selected from the group of linear or branched, saturated or unsaturated aliphatic carboxylic acids. The most preferred carboxylic acids are oleic acid, neodecanoic acid and isomers of octanoic acid, such as 2-ethyl hexanoate. The second type of anion consists of one or more aromatic carboxylic acids. The aromatic carboxylic acids are molecules containing a phenyl ring to which the carboxylic moiety is directly or indirectly bonded through a saturated or unsaturated alkylene bridge; the phenyl ring can be additionally substituted with one or more alkyl groups. The preferred aromatic carboxylic acids are substituted derivatives of benzoic acid; the most preferred aromatic carboxylic acids, and in particular isopropyl benzoic acid, 4-ethyl benzoic acid, 2-methyl benzoic acid, 3-methylbenzoic acid, 4-methylbenzoic acid, 3,4-dimethyl benzoic acid and 2,4,6-trimethyl benzoic acid. The presence of aromatic carboxylic acids is very beneficial because their salts improve the initial color of the PVC formulations during processing without affecting transparency. Optionally, one or more co-stabilizers, such as β-diketones and dihydropyridines, solutions of barium carboxylate/barium carbonate (overbased barium see U.S. Pat. No. 5,656,202), zinc salts of aliphatic carboxylic acids (to have more flexibility in the ratio Ba/Zn), organic derivatives of phosphorous and, high boiling point hydrocarbons and plasticizers used as diluents can be added to the thermal stabilizers.

Liquid thermal PVC stabilizers are generally comprised of a) a mixture of barium and zinc salts of one or more linear or branched aliphatic saturated or unsaturated carboxylic acids containing from 6 to 20 carbon atoms and of one or more aromatic carboxylic acid containing from 8 to 10 carbon atoms, wherein the weight ratio of aliphatic acids salts to aromatic acids salts is higher than 3:1 and b) one or more organic phosphites of the formula R1OP(OR2)OR3 wherein R1, R2 and R3 are the same or different and each is an alkyl group containing from 6 to 15 carbon atoms or phenyl group or C10-C20 alkyl aryl. These types of stabilizers are described in US Patent App. No. 2294122, European Patent No. 0792317, U.S. Pat. No. 5,880,0189 and International Patent App. No. WO2010000734A1. It has been found that the liquid type stabilizers show the best thermal stability performance in PVC/PHA blends especially when combined with secondary heat stabilizers such as plasticizers, antioxidants and lubricants which help to prevent thermo-oxidative degradation. Another type of mixed metal stabilizer composition is described in European Patent App. No. 0849314 A1 which consists of (A) about 10 to about 40 parts by weight of a zinc carboxylate; (B) about 50 to about 80 parts by weight of an alkyl ester of thiodipropionic acid; and (C) about 5 to about 20 parts by weight of a phenolic antioxidant.

Other PVC heat stabilizers that may be used in PVC/PHA blends include mild alkalis such as sodium carbonate; various metal-free organic compounds such as the polyols, e.g. mannitol, sorbitol, glycerol and pentaerythritol; 1,2-epoxides, e.g. soy bean oil epoxide, isooctyl epoxystearate and the diglycidyl ether of 2,2-bis(p-hydroxyphenyl) propane; nitrogen compounds such as phenylurea, N,N-diphenylthiourea, and 2-phenylindole; organotin mercaptides (U.S. Pat. No. 2,641,588); mercaptoesters and thioglucolates which reportedly impart multifunctional stabilization (European Pat. No. 0813572); diketones complexed with metal salts of organic acids such as calcium benzoate, 1,3-diphenylpropane-1,3-dionate (European Pat. No. 1517878); alkyl tin compounds as described in European Pat. App. No. 1877413.

Co-stabilizers such as organic phosphites are also known to impart thermal stability to chlorine-containing polymers and may also be suitable for PVC/PHA blends. These include triesters of phosphoric acid such as trioctyl, tridecyl, tridodecyl, tritridecyl, tripentadecyl, trioleyl, tristearyl, triphenyl, tricresyl, tris(nonylphenyl), tris(2,4-tert-butylphenyl) and tricyclohexyl phosphite (International Pat. No WO2005019323); phosphite compositions comprising at least two of a tris(dibutylaryl) phosphite, a tris(monobutylaryl) phosphite, a bis(dibutylaryl)monobutylaryl phosphite, and a bis(monobutylaryl)dibutylaryl phosphite (U.S. Pat. No. 8,008,384); phosphite mixtures with amines to make them hydrolytically stable (European Patent App. No. 2459575).

PHA's described in the invention can also promote the thermal stability of PVC by working synergistically with metal salt-based heat stabilizers, reducing the overall melt viscosity of the PVC which lowers shear-induced degradation during processing.

Additives

In certain embodiments, various additives are added to the compositions. Examples of these additives include, but are not limited to, antioxidants, pigments, compatibilizers, thermal and UV stabilizers, inorganic and organic fillers, plasticizers, and optionally nucleating agents which are not typically needed in the compositions of the invention, anti-slip agents, anti-blocking agents and radical scavengers. In one embodiment, inorganic fillers such as calcium carbonate or silica are added to high rubber content PHA's (e.g. greater than 30% by weight 4-hydroxybutyrate content) in order to make the "rubber" PHA easier to handle and process with the PVC by reducing the surface tack of the PHA.

In other embodiments, the compositions and methods of the invention include a branching or crosslinking agent. The branching agents, also referred to as free radical initiators, for use in the compositions and method described herein include organic peroxides which are melt blended using a twin screw extruder with the PHA's by a reactive extrusion process. Peroxides are free radical generating molecules which react with polymer molecules or previously branched polymers by removing a hydrogen atom from the polymer backbone, leaving behind a polymer free radical. Polymer molecules having such radicals on their backbone are free to combine with each other, creating branched or crosslinked polymer molecules. Branching agents are selected from any suitable initiator known in the art, such as peroxides, azo-derivatives (e.g., azo-nitriles), peresters, and peroxycarbonates. Suitable peroxides for use in the present invention include, but are not limited to, organic peroxides, for example dialkyl organic peroxides such as 2,5-dimethyl-2,5-di(t-butylperoxy) hexane, 2,5-dimethyl-2,5-di(t-amylperoxy) hexane, 2,5-bis(t-butylperoxy)-2,5-dimethylhexane (available from Akzo Nobel as TRIGONOX® 101), 2,5-dimethyl-di(t-butylperoxy)hexyne-3, di-t-butyl peroxide, dicumyl peroxide, benzoyl peroxide, di-t-amyl peroxide, t-butylperoxy-2-ethylhexylcarbonate (Available from Akzo Nobel as TRIGONOX® 117), t-amylperoxy-2-ethylhexyl-carbonate (TAEC), t-butyl cumyl peroxide, n-butyl-4,4-bis (t-butylperoxy)valerate, 1,1-di(t-butylperoxy)-3,3,5-trimethyl-cyclohexane, 1,1-bis(t-butylperoxy)-3,3,5-trimethylcyclohexane (CPK), 1,1-di(t-butylperoxy) cyclohexane, 1,1-di(t-amylperoxy)-cyclohexane, 2,2-di(t-butylperoxy)butane, ethyl-3,3-di(t-butylperoxy)butyrate, 2,2-di(t-amylperoxy)propane, ethyl-3,3-di(t-amylperoxy) butyrate, t-butylperoxy-acetate, t-amylperoxyacetate, t-butylperoxybenzoate, t-amylperoxybenzoate, di-t-butyldiperoxyphthalate, and the like. Combinations and mixtures of peroxides can also be used. Examples of free radical initiators include those mentioned herein, as well as those described in, e.g., *Polymer Handbook*, 3rd Ed., J. Brandrup & E. H. Immergut, John Wiley and Sons, 1989, Ch. 2. Irradiation (e.g., e-beam or gamma irradiation) can also be used to generate polymer branching.

As discussed above, when peroxides decompose, they form very high energy radicals that can extract a hydrogen atom from the polymer backbone. These radicals have short half-lives, thereby limiting the population of branched molecules that is produced during the active time period.

Cross-linking agents, also referred to as co-agents, used in the methods and compositions of the invention are cross-linking agents comprising two or more reactive functional groups such as epoxides or double bonds. These cross-linking agents modify the properties of the polymer. These properties include, but are not limited to, melt strength or toughness. One type of cross-linking agent is an "epoxy functional compound." As used herein, "epoxy functional compound" is meant to include compounds with two or more epoxide groups capable of increasing the melt strength of polyhydroxyalkanoate polymers by branching, e.g., end branching as described above.

When an epoxy functional compound is used as the cross-linking agent in the disclosed methods, a branching agent is optional. As such one embodiment of the invention is a method of branching a starting polyhydroxyalkanoate polymer (PHA), comprising reacting a starting PHA with an epoxy functional compound. Alternatively, the invention is a method of branching a starting polyhydroxyalkanoate polymer, comprising reacting a starting PHA, a branching agent and an epoxy functional compound. Alternatively, the invention is a method of branching a starting polyhydroxyalkanoate polymer, comprising reacting a starting PHA, and an epoxy functional compound in the absence of a branching agent. Such epoxy functional compounds can include epoxy-functional, styrene-acrylic polymers (such as, but not limited to, e.g., JONCRYL® ADR-4368 (BASF), or MP-40 (Kaneka)), acrylic and/or polyolefin copolymers and oligomers containing glycidyl groups incorporated as side chains (such as, but not limited to, e.g., LOTADER® (Arkema), poly(ethylene-glycidyl methacrylate-co-methacrylate)), and epoxidized oils (such as, but not limited to, e.g., epoxidized soybean, olive, linseed, palm, peanut, coconut, seaweed, cod liver oils, or mixtures thereof, e.g., Merginat ESBO (Hobum, Hamburg, Germany) and EDENOL® B 316 (Cognis, Dusseldorf, Germany)).

For example, reactive acrylics or functional acrylics cross-linking agents are used to increase the molecular weight of the polymer in the branched polymer compositions described herein. Such cross-linking agents are sold commercially. BASF, for instance, sells multiple compounds under the trade name JONCRYL®, which are described in U.S. Pat. No. 6,984,694 to Blasius et al., "Oligomeric chain extenders for processing, post-processing and recycling of condensation polymers, synthesis, compositions and applications," incorporated herein by reference in its entirety. One such compound is JONCRYL® ADR-4368CS, which is styrene glycidyl methacrylate and is discussed below. Another is MP-40 (Kaneka). And still another is the Petra line from Honeywell, see for example, U.S. Pat. No. 5,723,730. Such polymers are often used in plastic recycling (e.g., in recycling of polyethylene terephthalate) to increase the molecular weight (or to mimic the increase of molecular weight) of the polymer being recycled. Such polymers often have the general structure:

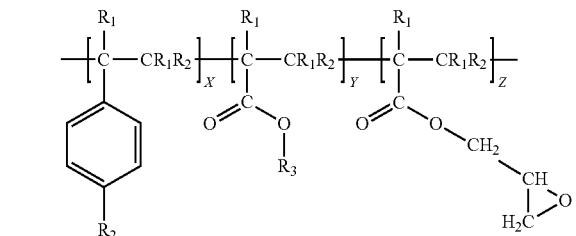

$R_1$ and $R_2$ are H or alkyl
$R_3$ is alkyl
x and y are 1-20
z is 2-20

E.I. du Pont de Nemours & Company sells multiple reactive compounds under the trade name ELVALOY®, which are ethylene copolymers, such as acrylate copolymers, elastomeric terpolymers, and other copolymers. One such compound is ELVALOY® PTW, which is a copolymer of ethylene-n-butyl acrylate and glycidyl methacrylate. Omnova sells similar compounds under the trade names "SX64053," "SX64055," and "SX64056." Other entities also supply such compounds commercially.

Specific polyfunctional polymeric compounds with reactive epoxy functional groups are the styrene-acrylic copolymers. These materials are based on oligomers with styrene and acrylate building blocks that have glycidyl groups incorporated as side chains A high number of epoxy groups per oligomer chain are used, for example 5, greater than 10, or greater than 20. These polymeric materials generally have a molecular weight greater than 3000, specifically greater than 4000, and more specifically greater than 6000. These are commercially available from S.C. Johnson Polymer, LLC (now owned by BASF) under the trade name JONCRYL®, ADR 4368 material. Other types of polyfunctional polymer materials with multiple epoxy groups are acrylic and/or polyolefin copolymers and oligomers containing glycidyl groups incorporated as side chains A further example of such a polyfunctional carboxy-reactive material is a co- or ter-polymer including units of ethylene and glycidyl methacrylate (GMA), available under the trade name LOTADER® resin, sold by Arkema. These materials can further comprise methacrylate units that are not glycidyl. An example of this type is poly(ethylene-glycidyl methacrylate-co-methacrylate).

Fatty acid esters or naturally occurring oils containing epoxy groups (epoxidized) can also be used. Examples of naturally occurring oils are olive oil, linseed oil, soybean oil, palm oil, peanut oil, coconut oil, seaweed oil, cod liver oil, or a mixture of these compounds. Particular preference is given to epoxidized soybean oil (e.g., Merginat ESBO from Hobum, Hamburg; EDENOL® B 316 from Cognis, Dusseldorf; PARAPLEX® G-62 from Hallstar), but others may also be used.

Other types of cross-linking agent include agents with two or more double bonds. Cross-linking agents with two or more double bond cross-link PHAs by after reacting at the double bonds. Examples of these include: diallyl phthalate, pentaerythritol tetraacrylate, trimethylolpropane triacrylate, pentaerythritol triacrylate, dipentaerythritol pentaacrylate, diethylene glycol dimethacrylate, bis(2-methacryloxyethyl) phosphate.

In general, it appears that compounds with terminal epoxides perform better than those with epoxide groups located elsewhere on the molecule.

Compounds having a relatively high number of end groups are the most desirable. Molecular weight may also play a role in this regard, and compounds with higher numbers of end groups relative to their molecular weight (e.g., the JONCRYL®s are in the 3000-4000 g/mol range) are likely to perform better than compounds with fewer end groups relative to their molecular weight (e.g., the Omnova Solutions products have molecular weights in the 100,000-800,000 g/mol range).

Additionally, polyfunctional co-agents such as divinyl benzene, triallyl cyanurate and the like may be added as well. Such co-agents can be added to one or more of these additives for easier incorporation into the polymer. For instance, the co-agent can be mixed with a plasticizer, e.g., a non-reactive plasticizer, e.g., a citric acid ester, and then compounded with the polymer under conditions to induce branching. Other co-agents useful in the compositions of invention, for example, compositions of the first, second, third or fourth aspect are hyperbranched or dendritic polyesters, such as dendritic and hyperbranched acrylates those sold by Sartomer, e.g., BOLTRON™ H20.

In compositions for use in the methods and compositions described herein, for example, plasticizers are often used to change the glass transition temperature and modulus of the composition, but surfactants may also be used. Lubricants may also be used, e.g., in injection molding applications. Plasticizers, surfactants and lubricants may all therefore be included in the overall composition.

In other embodiments, the compositions and methods of the invention include one or more plasticizers. The plasticizers can be petroleum based and/or biobased. Examples of plasticizers include phthalic compounds (including, but not limited to, dimethyl phthalate, diethyl phthalate, dibutyl phthalate, dihexyl phthalate, di-n-octyl phthalate, di-2-ethylhexyl phthalate, diisooctyl phthalate, dicapryl phthalate, dinonyl phthalate, diisononyl phthalate, didecyl phthalate, diundecyl phthalate, dilauryl phthalate, ditridecyl phthalate, dibenzyl phthalate, dicyclohexyl phthalate, butyl benzyl phthalate, octyl decyl phthalate, butyl octyl phthalate, octyl benzyl phthalate, n-hexyl n-decyl phthalate, n-octyl phthalate, and n-decyl phthalate), phosphoric compounds (including, but not limited to, tricresyl phosphate, trioctyl phosphate, triphenyl phosphate, octyl diphenyl phosphate, cresyl diphenyl phosphate, and trichloroethyl phosphate), adipic compounds (including, but not limited to, dibutoxyethoxyethyl adipate (DBEEA), dioctyl adipate, diisooctyl adipate, di-n-octyl adipate, didecyl adipate, diisodecyl adipate, n-octyl n-decyl adipate, n-heptyl adipate, diisononyl and n-nonyl adipate), sebacic compounds (including, but not limited to, dibutyl sebacate, dioctyl sebacate, diisooctyl sebacate, and butyl benzyl sebacate), azelaic compounds, citric compounds (including, but not limited to, triethyl citrate, acetyl triethyl citrate, tributyl citrate, acetyl tributyl citrate, and acetyl trioctyl citrate), glycolic compounds (including, but not limited to, methyl phthalyl ethyl glycolate, ethyl phthalyl ethyl glycolate, and butyl phthalyl ethyl glycolate), trimellitic compounds (including, but not limited to, trioctyl trimellitate and tri-n-octyl n-decyl trimellitate), phthalic isomer compounds (including, but not limited to, dioctyl isophthalate and dioctyl terephthalate), ricinoleic compounds (including, but not limited to, methyl acetyl, recinoleate and butyl acetyl recinoleate), polyester compounds (including, but not limited to, reaction products of diols selected from butane diol, ethylene glycol, propane 1,2 diol, propane 1,3 diol, polyethylene glycol, glycerol, diacids selected from adipic acid, succinic acid, succinic anhydride and hydroxyacids such as hydroxystearic acid, epoxidized soy bean oil, chlorinated paraffins, chlorinated fatty acid esters, fatty acid compounds, plant oils, pigments, and acrylic compounds. The plasticizers may be used either alone respectively or in combinations with each other.

In certain embodiments, the compositions and methods of the invention include one or more antioxidants. The antioxidants function as secondary heat stabilizers for the PVC/PHA blends and include compounds such as alkylated monophenols, e.g., 2,6-di-tert-butyl-4-methyl-phenol; alkylthiomethylphenols, e.g., 2,4-dioctylthiomethyl-6-tert-butyl-phenol; alkylated hydroquinones, e.g., 2,6-di-tert-butyl-4-methoxyphenol; hydroxylated thiodiphenyl ethers, e.g., 2,2'-thiobis(6-tert-butyl-4-methylphenol); alkylidenebisphenols, e.g., 2,2'-methylenebis(6-tert-butyl-4-methylphenol); benzyl compounds, e.g., 3,5,3',5'-tetra-tert-butyl-4,4'-dihydroxydibenzyl ether; hydroxybenzylated malonates, e.g., dioctadecyl 2,2-bis(3,5-di-tert-butyl-2-hydroxybenzyl)malonate; hydroxybenzyl aromatics, e.g., 1,3,5-tris(3,5-di-tert-butyl-4-hydroxybenzyl)-2,4,6-trimethylbenzene; triazine compounds, e.g., 2,4-bisoctylmercapto-6-(3,5-di-tert-butyl-4-hydroxyanilino)-1,3,5-triazine; phosphonates and phosphonites, e.g., dimethyl 2,5-di-tert-butyl-4-hydroxybenzylphosphonate; acylaminophenols, e.g., 4-hydroxylauranilide; esters of β-(3,5-di-tert-butyl-4-hydroxyphenyl)propionic acid, β-(5-tert-butyl-4-hydroxy-3-methylphenyl)propionic acid, P-(3,5-dicyclohexyl-4-hydroxyphenyl)propionic acid; esters of 3,5-di-tert-butyl-4-hydroxyphenylacetic acid with mono- or polyhydric alcohols; amides of β-(3,5-di-tert-butyl-4-hydroxyphenyl)propionic acid e.g. N,N'-bis(3,5-di-tert-butyl-4-hydroxyphenyl-propionyl)hexamethylenediamine, vitamin E (tocopherol) and derivatives of the foregoing. Mixtures of the antioxidants may also be used.

In certain embodiments, the compositions and methods of the invention include one or more surfactants. Surfactants are generally used to de-dust, lubricate, reduce surface tension, and/or densify. Examples of surfactants include, but are not limited to mineral oil, castor oil, and soybean oil. One mineral oil surfactant is Drakeol 34, available from Penreco (Dickinson, Tex., USA). Maxsperse W-6000 and W-3000 solid surfactants are available from Chemax Polymer Additives (Piedmont, S.C., USA). Non-ionic surfactants with HLB values ranging from about 2 to about 16 can be used, examples being TWEEN®-20, TWEEN®-65, SPAN®-40 and SPAN®-85.

Anionic surfactants include: aliphatic carboxylic acids such as lauric acid, myristic acid, palmitic acid, stearic acid, and oleic acid; fatty acid soaps such as sodium salts or potassium salts of the above aliphatic carboxylic acids; N-acyl-N-methylglycine salts, N-acyl-N-methyl-beta-alanine salts, N-acylglutamic acid salts, polyoxyethylene alkyl ether carboxylic acid salts, acylated peptides, alkylbenzenesulfonic acid salts, alkylnaphthalenesulfonic acid salts, naphthalenesulfonic acid salt-formalin polycondensation products, melaminesulfonic acid salt-formalin polycondensation products, dialkylsulfosuccinic acid ester salts, alkyl sulfosuccinate disalts, polyoxyethylene alkylsulfosuccinic acid disalts, alkylsulfoacetic acid salts, (alpha-olefinsulfonic acid salts, N-acylmethyltaurine salts, sodium dimethyl 5-sulfoisophthalate, sulfated oil, higher alcohol sulfuric acid ester salts, polyoxyethylene alkyl ether sulfuric acid salts, secondary higher alcohol ethoxysulfates, polyoxyethylene alkyl phenyl ether sulfuric acid salts, monoglysulfate, sulfuric acid ester salts of fatty acid alkylolamides, polyoxyethylene alkyl ether phosphoric acid salts, polyoxyethylene alkyl phenyl ether phosphoric acid salts, alkyl phosphoric acid salts, sodium alkylamine oxide bistridecylsulfosuccinates, sodium dioctylsulfosuccinate, sodium dihexylsulfosuccinate, sodium dicyclohexylsulfosuccinate, sodium diamylsulfosuccinate, sodium diisobutylsulfosuccinate, alkylamine guanidine polyoxyethanol, disodium sulfosuccinate ethoxylated alcohol half esters, disodium sulfosuccinate ethoxylated nonylphenol half esters, disodium isodecylsulfosuccinate, disodium N-octadecylsulfosuccinamide, tetrasodium N-(1,2-dicarboxyethyl)-N-octadecylsulfosuccinamide, disodium mono- or didodecyldiphenyl oxide disulfonates, sodium diisopropylnaphthalenesulfonate, and neutralized condensed products from sodium naphthalenesulfonate.

One or more lubricants can also be added to the compositions and methods of the invention. Lubricants are normally used to reduce sticking to hot processing metal surfaces but can also act as a secondary thermal stabilizer and include polyethylene, paraffin oils, epoxidized soybean oil and other vegetable oils, and paraffin waxes in combination with metal stearates. Other lubricants include stearic acid, amide waxes, ester waxes, metal carboxylates, and carboxylic acids. Lubricants are normally added to polymers in the range of about 0.1 percent to about 1 percent by weight, generally from about 0.7 percent to about 0.8 percent by weight of the compound. Solid lubricants is warmed and melted before or during processing of the blend.

In film applications of the compositions and methods described herein, anti-block masterbatch is also added. A suitable example is a slip anti-block masterbatch mixture of erucamide (20% by weight) diatomaceous earth (15% by weight) nucleant masterbatch (3% by weight), pelleted into PHA (62% by weight). Others are known to those of ordinary skill in the field of polymer processing.

If desired, an optional nucleating agent is added to the compositions of the invention to aid in its crystallization if needed. Nucleating agents for various polymers are simple substances, metal compounds including composite oxides, for example, carbon black, calcium carbonate, synthesized silicic acid and salts, silica, zinc white, clay, kaolin, basic magnesium carbonate, mica, talc, quartz powder, diatomite, dolomite powder, titanium oxide, zinc oxide, antimony oxide, barium sulfate, calcium sulfate, alumina, calcium silicate, metal salts of organophosphates, and boron nitride, cyanuric acid and the like.

It has been found that a combination of PLASTISTAB® 2442 (4 phr), PARAPLEX® G-62 (4.5 phr) and the plasticizer diisononyl adipate (18 phr) additives in a PVC/PHA blend formulations (e.g., PHA C, or PHA H, the copolymer of P3HB-4HB with 55% 4HB) described here give very good light stabilizing properties so that no UV light stabilizers are needed for outdoors uses of the formulation.

Application of the Compositions

PVC and the compositions described herein may be used for many applications, including but not limited to construction materials (e.g., doors, windows, siding, pipes, tubing, coatings), packaging material, automotive products and also medical applications (e.g. tubing or bags for liquid storage).

For the fabrication of useful articles, the compositions described herein are processed preferably at a temperature above the crystalline melting point of the polymers but below the decomposition point of any of the ingredients (e.g., the additives described above, with the exception of some branching agents) of the polymeric composition. While in heat plasticized condition, the polymeric composition is processed into a desired shape, and subsequently cooled to set the shape and induce crystallization. Such shapes can include, but are not limited to, a fiber, filament, film, sheet, rod, tube, bottle, or other shape. Such processing is performed using any art-known technique, such as, but not limited to, extrusion, injection molding, compression molding, blowing or blow molding (e.g., blown film, blowing of foam), calendaring, rotational molding, casting (e.g., cast sheet, cast film), or thermoforming. Thermoforming is a process that uses films or sheets of thermoplastic. The polymeric composition is processed into a film or sheet. The sheet of polymer is then placed in an oven and heated. When soft enough to be formed it is transferred to a mold and formed into a shape.

During thermoforming, when the softening point of a semi-crystalline polymer is reached, the polymer sheet begins to sag. The window between softening and droop is usually narrow. It can therefore be difficult to move the softened polymer sheet to the mold quickly enough. Measuring the sag of a sample piece of polymer when it is heated is therefore a way to measure the relative size of this processing window for thermoforming.

The advantages of light stabilization and stability are desirable for certain application.

Films, Sheets and Tapes

The compositions of the inventions are for producing films, sheets and tape with certain properties and/or characteristics.

The films or sheets can be single layer or multilayer. Suitable thicknesses include, 0.005 mm to about 0.01 mm, 0.01 mm, 0.02 mm, 0.03 mm, 0.04 mm, 0.05 mm, 0.06 mm, 0.07 mm, 0.08 mm, 0.09 mm or 0.1 mm. The film or sheet can be optically clear or opaque. The films and sheets can be further processed to tapes. The tapes can optionally include an adhesive layer on one or both sides. Also included are laminates.

Applications

The compositions described herein can be processed into films of varying thickness, for example, films of uniform thickness ranging from 1-200 microns, for example, 10-75 microns, 75 to 150 microns, or from 50-100 microns. Film layers can additionally be stacked to form multilayer films of the same or varying thicknesses or compositions of the same or varying compositions.

Blow molding, which is similar to thermoforming and is used to produce deep draw products such as bottles and similar products with deep interiors, also benefits from the increased elasticity and melt strength and reduced sag of the polymer compositions described herein.

Articles made from the compositions can be annealed according to any of the methods disclosed in International Publication No. WO 2010/008445, which was published in English on Jan. 21, 2010, and designated the United States, and is titled "Branched PHA Compositions, Methods For Their Production, And Use In Applications," which was filed in English and designated the United States. This application is incorporated by reference herein in their entirety.

The compositions described herein are provided in any suitable form convenient for an intended application. For example, the composition is provided in pellet for subsequent production of films, coatings, moldings or other articles, or the films, coatings, moldings and other articles.

The polymeric compositions of the present invention can be used to create, without limitation, a wide variety of useful products, e.g., automotive, consumer durable, consumer disposable, construction, electrical, medical, and packaging products. For instance, the polymeric compositions can be used to make, without limitation, films (e.g., packaging films, agricultural film, mulch film, erosion control, hay bale wrap, slit film, food wrap, pallet wrap, protective automobile and appliance wrap, etc.), bags (e.g., trash bags, grocery bags, food bags, compost bags, etc.), hygiene articles (e.g., diapers, feminine hygiene products, incontinence products, disposable wipes, etc.), coatings for pelleted products (e.g., pelleted fertilizer, herbicides, pesticides, seeds, etc.), packaging (including, but not limited to, packaging and containers for food and beverage products, cosmetic products, detergents and cleaning products, personal care products, pharmaceutical and wellness products), golf tees, caps and closures, agricultural supports and stakes, paper and board coatings (e.g., for cups, plates, boxes, etc.), thermoformed products (e.g., trays, containers, yoghurt pots, plant pots, noodle bowls, moldings, etc.), housings (e.g., for electronics items, e.g., cell phones, PDA cases, music player cases, computer cases, printers, calculators, LCD projectors, connectors, chip trays, circuit breakers, plugs, and the like), wire and cable products (including, but not limited to, wire, cable and coatings for wire and cable for vehicles, cars, trucks, airplanes, aerospace, construction, military, telecommunication, utility power, alternative energy, and electronics), industrial products (such as, but not limited to, containers, bottles, drums, materials handling, gears, bearings, gaskets and seals, valves, wind turbines, and safety equipment), products for transportation (such as, but not limited to, automotive aftermarket parts, bumpers, window seals, instrument panels, consoles, under hood electrical parts, and engine covers), appliances and appliance parts (such as, but not limited to, refrigerators, freezers, washers, dryers, toasters, blenders, vacuum cleaners, coffee makers, and mixers), articles for use in building and construction (such as, but not limited to, fences, decks and rails, floors, floor covering, pipes and fittings, siding, trim, windows, doors, molding, and wall coverings), consumer goods and parts for consumer goods (such as, but not limited to, power hand tools, rakes, shovels, lawn mowers, shoes, boots, golf clubs, fishing poles, and watercraft), healthcare equipment (including, but not limited to, wheelchairs, beds, testing equipment, analyzers, labware, ostomy, IV sets, wound care, drug delivery, inhalers, and packaging). In short, the polymeric products described herein can be used to make the items currently made from conventional petroleum-based polymers.

In general, there is an increasing consumer demand for products that have a measurable biobased content. Where the PHA's of the current invention are made from renewable resources then the exact percentage of renewable carbon can be determined via ASTM D6866—an industrial application of radiocarbon dating. ASTM D6866 measures the "modern" Carbon 14 content of biobased materials; and since fossil-based materials no longer have Carbon 14, ASTM D6866 can effectively dispel inaccurate claims of biobased content. Accuracy of radioanalytical procedures used to determine the biobased content of manufactured products is outlined in Norton et al., *Bioresource Technology*, 98:1052-1056 (2007), incorporated herein by reference.

In the compositions of the invention for making articles the bio-based chemicals comprise at least about 50% (e.g., at least about 60%, at least about 65%, at least about 70%, at least about 75%, at least about 80%, at least about 85%, at least about 90%, or at least about 95%, at least about 96%, at least about 97%, at least about 98%, at least about 99%, up to 100%) bio-based content based on the total weight of the composition. In this regard, the synthetic polymer is composed of a sufficient amount of bio-based components (i.e., the precursors are substantially composed of materials derived from renewable resources), and the composition comprises a sufficient amount to achieve the desired bio-based content level.

The specific examples below are to be construed as merely illustrative, and not limitative of the remainder of the disclosure in any way whatsoever. Without further elaboration, it is believed that one skilled in the art can, based on the description herein, utilize the present invention to its fullest extent. All publications cited herein are hereby incorporated by reference in their entirety.

EXAMPLES

Experimental Methods

Measurement of the Mechanical Properties

Tensile properties of the PVC/PHA blends were measured according to ASTM D638-03; flexural properties were measured according to ASTM D790-03; notched Izod Impact properties were measured according to ASTM D256-06; Elmendorf resistance to tear propagation was measured according to ASTM D 1922-06; Shore D Hardness was measured according to ASTM D2240 and low temperature brittleness was measured according to ASTM D746 (the results are reported as pass or fail (break on impact)).

Measurement of Melt Strength and Viscosity

Melt strength, G', and viscosity, $\eta^*$, was measured using oscillatory torsional rheology. The measurements were performed using a TA Instruments AR2000 rheometer employing strain amplitude of 1%. First, pellets (or powder) were molded into 25 mm diameter discs that were about 1200 microns in thickness. The disc specimens were molded in a compression molder set at about 165-177° C., with the molding time of about 30 seconds. These molded discs were then placed in between the 25 mm parallel plates of the AR2000 rheometer, equilibrated at 185° C., and subsequently cooled to 160° C. for the frequency sweep test. A gap of 800-900 microns was used, depending on the normal forces exerted by the polymer. The melt density of PHB was determined to be about 1.10 g/cm$^3$ at 160° C.; this value was used in all the calculations.

Specifically, the specimen disc was placed between the platens of the parallel plate rheometer set at 185° C. After the final gap was attained, excess material from the sides of the platens was scraped. The specimen was then cooled to 160° C. where the frequency scan (from 625 rad/s to 0.10 rad/s) was then performed; frequencies lower than 0.1 rad/s were avoided because of considerable degradation over the long time it takes for these lower frequency measurements. The specimen loading, gap adjustment and excess trimming, all carried out with the platens set at 185° C., takes about 2½ minutes. This was controlled to within ±10 seconds to minimize variability and sample degradation. Cooling from 180° C. to 160° C. (test temperature) was accomplished in about four minutes. Exposure to 180° C. ensures a completely molten polymer, while testing at 160° C. ensures minimal degradation during measurement.

During the frequency sweep performed at 160° C., the following data was collected as a function of measurement frequency: $\eta^*$ or complex viscosity, G' or elastic modulus (elastic or solid-like contribution to the viscosity) and G" or loss modulus (viscous or liquid-like contribution to the viscosity). For purposes of simplicity, G' measured at an imposed frequency of 0.25 rad/s as a measure of "melt strength" was used. Higher G' value therefore translated to higher melt strength.

Measurement of Glass Transition Temperature ($T_g$) and Percent Crystallinity

The glass transition temperature, $T_g$, of PVC/PHA blends was measured using a TA Instruments Q100 Differential Scanning calorimeter (DSC). The unknown PHA samples were put through a heating-cooling-heating cycle at 10° C./min from −50° C. to 200° C. The Tg was then measured using the second heating curve by taking the midpoint of the change in slope of the glass transition. Percent crystallinity was also measured using the TA Instruments Q100 DSC. The heat of melting (J/g) for each unknown PHA sample was measured by integrating the area under the respective melting peak. The heat of melting for each unknown PHA sample was then divided by the heat of melting from a PHA sample of known % crystallinity and multiplied by its % crystallinity value.

Measurement of Thermal Stability

The thermal stability of PVC/PHA blends was measured using a TA Instrument Q500 TGA (Thermal Gravimetric Analyzer). Approximately 40-50 mg of the blend was placed in to a tared platinum pan and loaded, with the aid of an autosampler, on to the instrument balance and then TGA furnace raised around the sample. The sample was then heated under nitrogen gas, at rates of 2.5 to 20° C./min from room temperature to 600° C. The weight loss of the sample versus the temperature was recorded and plotted. The slopes of the weight loss versus temperature were calculated and the activation energies ($E_a$) for thermal degradation were determined using the Kissinger equation which is as follows:

$$\beta E_a/RT^2_m = A(n(1-\alpha)^{n-1}_m)\exp(-E_a/RT_m),$$

where
α—conversion;
$E_a$—apparent activation energy (kJ/mol)
A—pre-exponential factor
β—heating rate (° C./min)
R—general gas constant (J/mol ° K)
$T_m$—temperature at maximum degradation rate (° K)
n—reaction order The Kissinger method has shown that the product $n(1-\alpha)^{n-1}_m$ equals 1 and is independent of the heating rate. The dependence of $\ln(\beta/T^2_m)$ vs. $1/RT_m$ represents a straight line whose slope can be used to calculate $E_a$ and intercept be used to calculate the pre-exponential factor.

Measurement of PHA Molecular Weight

The absolute weight average molecular weight for the PHA materials was determined by using a flow injection polymer analysis system (TDAmax™, Viscotek Corp). It is a liquid chromatography technique whereby the polymer to be measured is first dissolved in a solvent, filtered and then injected into the FIPA instrument. Once injected, the polymer solution is carried by mobile phase solvent and elutes through a single, low volume size exclusion chromatography column. The column acts to separate the polymer, solvent and any other impurities present in the sample. The detection system consists of a refractive index, light scattering and solution viscosity detectors. The absolute weight average molecular weight of the polymer is determined using the light scattering detector.

To prepare the polymer sample, it was first dissolved in chloroform to a concentration of 2.0 mg/ml at 60° C. After cooling the sample, it was then filtered with a 0.2 micrometer Teflon syringe filter and injected into the instrument. The FIPA unit operated at a temperature of 45° C. with tetrahydrofuran solvent as the mobile phase. The mobile phase flow rate was 1.0 ml/min. A 100 μl injection volume was used for the analysis of the polymer solution. Once the sample chromatogram was collected, it was the analyzed with the Viscotek Omni-Sec software to determine the absolute weight average molecular weight in units of grams/mole.

Measurement of UV/Photostability

The UV or photostability of PVC/PHA blends was measured by exposing PVC/PHA films to a UV light source, heat and moisture using a Ci65 Weatherometer equipped with a Xenon Arc lamp as outlined in ASTM G155. Films of the PVC/PHA blends were exposed to 2250 kJ UV radiation over a period of several days to weeks. After exposure, the films were visually compared and then measured for color changes using an Xrite ColorEye 700A spectrophotometer. The color variables DL*, Da*, Db* and DE* were measured for each PVC film blend and then compared.

Measurement of Fungal Resistance

The fungal resistance of PVC blend films were measured in triplicate according to ASTM G21-09 method. The test conditions were as follows: T=28-30° C., relative humidity>85%, test duration 28 days, 5 active test organisms were applied to the films. After the test was completed, the films were visually evaluated for signs of fungal growth.

Measurement of PHA Composition

The weight percent 4-hydroxybutyrate contained in the PHA copolymers was determined by acid alcoholysis followed by GC-FID analysis. A 10-15 mg sample of the dry copolymer was first weighed in to a test tube. Then 2-5 ml of a reagent containing n-butanol (99%, EMD), 4M HCl in dioxane (Sigma Aldrich) and the internal standard diphenylmethane was pipetted in to the test tube. The test tube was capped and heated at 93° C. for 6 hours using a heater block. After the alcoholysis reaction was completed, the test tube contents were cooled to room temperature and 2-5 ml of DI water was added. The mixture was centrifuged and the organic top layer was pipetted out of the test tube and into a GC vial. The GC vial contents were then run on an Agilent Technologies, Model 6890N, GC-FID System having a ZB-35 30 m×0.25 mm×0.25 μm GC-FID column (Phenomenex). Standards for quantitating the weight %4HB in the copolymer were also prepared using γ-butyrolactone (99%, Sigma Aldrich).

Biobased Content

The biobased content or percent $^{14}C$ carbon relative to the total carbon in the PHA samples was measured by the radiocarbon dating method according to ASTM D6866.

PHA Materials

The PHA polymers utilized in the blend examples along with their weight average molecular weights, compositions, glass transition temperature (Tg), % crystallinity and biobased content are summarized in Table 1. All of the PHA's utilized in the PVC/PHA blends were copolymers of 3-hydroxybutyrate and 4-hydroxybutyrate or where indicated were blends of these copolymers having different %4HB content. PHA F was a thermolyzed version of PHA E in order to lower the molecular weight of the PHA resin. Table 1 also shows the weight percent rubber for each PHA blend or individual copolymer. When the % 4HB in a P3HB-4HB copolymer is above 25% by weight, the properties of the PHA are more like that of an amorphous rubber material. When these are blended with P3HB homopolymers, a multiphase material can be created which has a significant rubber or amorphous phase. The weight % rubber in Table 1 refers to the weight percent of the rubbery P3HB-4HB copolymer present having a weight %4HB of greater than 25%.

TABLE 1

Summary of PHA polymers used in the PVC/PHA blend examples. All of the PHA's were either copolymers of 3-hydroxybutyrate and 4-hydroxybutyrate or where indicated blends of these with poly-3-hydroxybutyrate.

| Polymer ID | $M_w$ | Total Weight % 4HB | Weight % Rubber PHA | Tg (° C.) | % Crystallinity | % Biobased Content |
|---|---|---|---|---|---|---|
| PHA A* | — | 4.4-5 | 0 | 1.3 ± 1 | 43-45 | 94 |
| PHA B** | — | 8-9 | 0 | −4 ± 1 | 38-43 | 90 |
| PHA C*** | 492,000 | 12-15 | 40 | −12 ± 2 | 26-28 | 84 |
| PHA D | — | 11 | 0 | −7 | 24-26 | — |
| PHA E⁺ | 1,538,000 | 29.6 | 100 | −14 | 0-1 | 66 |
| PHA F⁺ | 900,000 | 29.6 | 100 | −14 | 0-1 | 66 |
| PHA G**** | — | 16-18 | 40 | −12 ± 2 | 26-28 | — |
| PHA H† | 400,000 to 500,000 | 55 | 100 | −25 ± 1 | 0-1 | 100 |

*PHA A: Blend of 55-65% P3HB and 35-45% P3HB-4HB copolymer with 8-14% 4HB by weight.
**PHA B: Blend of 18-22% P3HB, 77-83% P3HB-4HB copolymer with 8-14% 4HB by weight.
***PHA C: Blend of 34-38% P3HB, 22-26% P3HB-4HB copolymer with 8-14% 4HB by weight and 38-42% P3HB-4HB copolymer with 25-33% 4HB by weight.
****PHA G: Blends of 10-14% P3HB, 46-50% P3HB-4HB copolymer with 8-14% 4HB by weight and 38-42% P3HB-4HB copolymer with 25-33% 4HB by weight.
⁺Tianjin SOGREEN ™ P3HB-4HB copolymer with 30% by weight 4HB.
†PHA H: Copolymer of P3HB-4HB with 55% 4HB content made from glucose feedstock. See PCT Application No. PCT/US2013/028913 incorporated herein by reference. 5-10% by weight CaCO₃ was also added to the PHA to facilitate handling of the rubber material.

PVC/PHA Formulations and Preparation

Polyvinylchloride (PVC) resins with K-values of 57 and 70 (OXY 185F, 190 and 240 from OxyVinyls LP or G2100 from S&E Specialty Polymers) were blended with the PHA's listed in Table 1. PVC formulations are usually classified by their durometer hardness values as rigid, semi-rigid or flexible (see ASTM classifications). In the following examples, the PVC formulations cover a range of compounds varying from rigid (0% plasticizer) to semi-rigid (18 phr plasticizer), to flexible (36 phr plasticizer). Diisodecyl phthalate (DIDP, Sigma Aldrich) was used as the monomeric, "nonextractable" plasticizer in the base PVC resin formulations. Heat stabilizers were also used in the PVC/PHA formulations including BaZn carboxylates such as MARK® 4781A (Galata Chemicals) or PLASTISTAB™ 2442 (AM Stabilizers Corp.) for preparing transparent PVC/PHA blends. A solid polymeric stabilizer NAFTOSAFE™ PKP1028 (Chemson Gesellschaft fur Polymer-Additive mbH) for preparing opaque PVC/PHA formulations added @2.5 phr. Two secondary heat stabilizers were also added to the PVC/PHA formulations. They were PLASTISOY™ 7.0 (CHS Inc. Corp.), epoxidized soybean oil, added @4.5 phr and HIPURE™ 4 (Dover Chemical Corp.), tris(nonylphenyl) phosphite, added @0.5 phr. The change in PVC impact properties by adding PHA was benchmarked against the commercial impact modifiers KANE ACE™ B-22 (methylmethacrylate/butadiene/styrene (MBS) copolymer, Kaneka) and ABS BLENDEX™ 3160 (an acrylonitrile/butadiene/styrene copolymer, Galata Chemicals). The acrylic processing aid KANE ACE™ PA-20 (Kaneka) was used for benchmarking against PHA as a melt fluxing additive. The peroxide branching agent TRIGONOX® 101 (Akzo Nobel) was used to modify the PHA's prior to mixing the PHA with PVC. The peroxide was melt blended and reacted with the PHA's using a Prism 16 mm twin screw extruder. After reacting, the melt mixture was extruded into a strand and cooled in a water bath at room temperature. After cooling the strands were either hand cut or cryogenically ground. TRIGONOX® 117 (Akzo Nobel) peroxide and pentaerythritol triacrylate (Sartomer) co-agent were used to prepare a masterbatch PVC impact modifier formulation with PHA C, acrylonitrile-styrene-acrylate (ASA) PVC impact modifier (Galata Chemicals) and chlorinated polyethylene (CPE) PVC impact modifier (Dow Chemicals).

The PVC/PHA formulations were prepared using a two roll mill for the compounding. The temperature for the rollers was set to 330° F. PHA's listed in Table 1 were added to the PVC resin @5 to 28 phr loading. All of the PVC/PHA blends released nicely from the rolls and it was possible to produce transparent blends when appropriate PVC heat stabilizers were used. It was generally observed that PVC formulations containing PHA's had much faster fusion and melting rates for the PVC particles during processing compared to PVC formulations which had no PHA or other processing agents present.

The milled PVC/PHA compounded sheets produced were then compression molded at 165-175° F. into the samples for tensile, tear strength, Izod Impact and other tests.

PMMA/PHA Formulations and Preparation

Polymethylmethacrylate (PMMA) resin from Evonik (PLEXIGLAS™ 8N) was blended with the polyhydroxyalkanoates PHA C and G (see Table 1). Table 2 below summarizes the properties of the PMMA resin:

TABLE 2

PMMA grades and properties.

| Property | PLEXIGLAS ™ 8N |
|---|---|
| Tg (° C.) | 117 |
| MFI (g/10 min, 230° C., 3.8 kg) | 3.57 |
| Density (g/cm³) | 1.19 |
| Tensile stress at break (MPa) | 77 |
| Elongation at break (MPa) | 5.5 |
| Tensile modulus (GPa) | 3.3 |
| Charpy unnotched impact (J/cm²) | 2 |
| Vicat softening point (° C.) | 108 |
| Haze (%) | ≤0.5 |
| Transmission, visible (%) | 92 |
| Refractive index | 1.49 |

The PMMA/PHA blends were prepared using a Prism twin screw, 16 mm, extruder having nine heated zones. The following temperature profile (inlet to outlet die) was used to process the blends 190° C./190° C./185° C./185° C./185° C./180° C./180° C./180° C./175° C./175° C. After melt extrusion, the blend was pelletized, the pellets were dried in an oven at 50° C. overnight and the dried pellets were compression molded at 185° C. into samples for measuring the thermal and mechanical properties.

POM/PHA Formulations and Preparation

Polyoxymethylene (POM) resins (copolymers of methylene oxide and ethylene glycol) were obtained from Korean Plastic Engineering and were blended with the polyhydroxyalkanoates PHA C and G (see Table 1). The POM resins were KEPITAL™ F20-30—an injection molding grade and KEPITAL™ F30-30—a low viscosity injection molding grade. For comparison an impact modified POM grade having 5% TPU, KEPITAL™ TE-21, was also tested.

The POM/PHA blends were prepared using a Prism twin screw, 16 mm, extruder having nine heated zones. The following temperature profile (inlet to outlet die) was used to process the blends 90° C./190° C./185° C./185° C./180° C./180° C./180° C./175° C./175° C./175° C. After melt extrusion, the blend was pelletized, the pellets were dried in an oven at 50° C. overnight and the dried pellets were compression molded at 185° C. into samples for measuring the thermal and mechanical properties.

Example 1

Addition of a Rubbery PHA Copolymer to Rigid PVC—Effect on Thermal, Mechanical and Melt Properties In this example, PHA E, a rubbery 30% 4HB copolymer, was added to a rigid PVC formulation (0% DIDP plasticizer) @28 phr (20% by weight) and the effect on the impact properties of the blend were evaluated. Table 3 summarizes the thermal and mechanical testing results for this blend.

TABLE 3

Summary of mechanical and thermal properties of a rigid PVC/0% DIDP/PHA E @28 phr blend.

| Property | Formulation 1 |
| --- | --- |
| Tg (° C.) | 32.3 |
| Tensile Modulus (MPa) | 1407 |
| Tensile Strain @break (MPa) | 102 |
| Tensile Toughness (J) | 3.31 |
| Flexural Modulus (MPa) | 1202 |
| Low Temperature Brittleness (5° C.) | passed |
| Izod Impact Strength (ft lb/in) | >18 |
| Shore D Hardness | 66 |

The results in Table 3 show that the rubbery PHA E was completely miscible with the PVC as evidenced by the single $T_g$ value measured by DMA analysis. Since pure PVC has a single $T_g$ at approximately 70° C., the results in Table 1 also indicated that the rubbery PHA E was very effective at plasticizing the rigid PVC. According to the measured $T_g$ value, the PVC blend $T_g$ was reduced by a factor of 2. The mechanical testing results showed that the rubbery PHA E added @28 phr significantly improved the impact strength and tensile toughness of the PVC without compromising the tensile or flexural moduli. The Hardness value also did not appear to change significantly with the addition of the PHA E. In comparison, PVC compounded with the commercial impact modifier KANE ACE™ B-22 only showed an impact strength of 1.9 ft lb/in. The PHA E therefore acted as a PVC plasticizer, impact modifier and processing aid all in one. This would eliminate the need to have multiple additives performing different functions for formulating PVC products thereby reducing costs.

The complete miscibility of the PHA E in PVC could be explained by comparing the solubility parameters of the PHA E copolymer components with that of PVC resin. The solubility parameter, δ, is a numerical estimate of the degree of interaction between materials and can be a good indication of solubility, particularly for non polar materials such as polymers. Materials with similar δ values are likely to be miscible. Table 4 shows the calculated solubility parameters (total, polar and nonpolar (dispersion) components see M. Terada, R. H. Marchessault, *International Journal of Biological Macromolecules*, 25, 1999, p 207-215) for PVC, poly-3-hydroxybutyrate (P3HB), poly-4-hydroxybutyrate (P4HB), diisodecylphthalate (DIDP) and poly-methylmethacrylate (PMMA). The latter two compounds are very common plasticizers and impact modifiers used in PVC formulations. As can be seen in Table 4, the calculated solubility parameters (using the Van Krevelen method) for PVC were most similar to P3HB polymer. This could explain why the PHA E which is 70% 3HB was found to be miscible with the PVC. It could be assumed that similarly to PVC/PMMA blends, the miscibility of PVC/PHA was attributed to the exothermic mixing arising from the formation of weak hydrogen bonds between the carbonyl groups of the PHA and the methine protons of the PVC. The best PVC impact and processing modifiers on the market today are based on acrylate copolymers such as P(MMA-co-BA) or P(MMA/co-MA) listed in Table 4. The PVC/PMMA blend is known to be miscible, while the impact absorbing PMA or PBA form immiscible blends with PVC. The non-toughening PMMA component is used to anchor the modifier to the PVC chains, while the phase separated PMA or PBA component provides the toughening. By the analogy with MMA and MA solubility parameters, it could be expected that P(3HB-co-4HB) with 30-45% 4HB would provide similar if not better modification than acrylic impact modifiers.

TABLE 4

Calculated solubility parameter values, δ, for PVC, PHA and other additives. Parameters calculated using the monomer group contribution method of Van Krevelen (Properties of Polymer, $4^{th}$ Ed., Elsevier, 2009). Included in the calculations are the polar and nonpolar contributions to the total solubility parameter.

| Polymer | $\delta_{total}$ (J/cm$^3$)$^{1/2}$ | $\delta_{polar}$ (J/cm$^3$)$^{1/2}$ | $\delta_{nonpolar}$ (J/cm$^3$)$^{1/2}$ |
| --- | --- | --- | --- |
| PVC | 21.2 | 24.1 | 16.1 |
| P3HB | 20.4 | 27.3 | 17.1 |
| P4HB | 19.8 | 27.3 | 16.1 |
| PMMA | 19.5 | 27.3 | 16.7 |
| PMA | 20.4 | 27.3 | 17.1 |
| DIDP | 17.6 | 27.3 | 16.3 |

Figure 2:
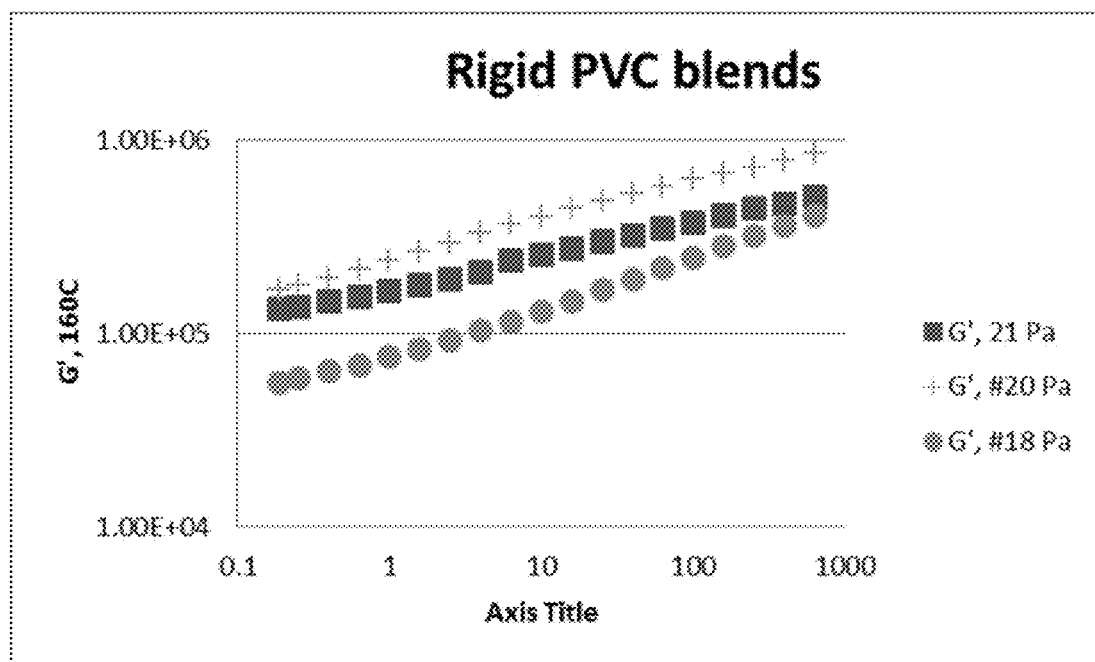
FIG. 2 is a plot showing melt strength vs. shear rate plot @160° C. for PVC with 18 phr DIDP plasticizer (control sample 20—squares); PVC with 10 phr KANE™ ACE B22 impact modifier and 18 phr DIDP (sample 18—circles); PVC with 28 phr PHA E no DIDP (sample 21—plus).

FIGS. 1 and 2 show the melt behavior of the PVC/PHA E 28 phr blend (sample #20) as compared to a PVC/DIDP 18 phr formulation (sample #21) and PVC/KANE ACE™ B22 formulation (sample #18). The data in FIGS. 1 and 2 was collected using rotational rheometry under standard conditions (preheating at 180° C., testing at 160° C.).

The data in FIGS. 1 and 2 shows that the PVC formulations with the PHA E additive, as compared to PVC with DIDP plasticizer or DIDP plasticizer and KANE™ ACE B22 impact modifier, had both higher viscosity and elastic modulus at all shear rates tested. This would be beneficial for instance in PVC blow molding or film applications requiring higher melt strength.

Example 2

Addition of PHA to Rigid PVC—Effect of Thermal Stabilizer Package

In this example, changes in the impact strength for a rigid PVC/PHA blend versus the type of PVC thermal stabilizer incorporated are compared. The PVC resin used to prepare the samples was OXYVINYLS™ 240 a high molecular PVC with K=70. The PHA used was the amorphous or rubbery copolymer, PHA F, having a %4HB content of 30% by weight. The samples for impact strength testing (Formulations #20 and #32) were prepared according to the procedure described previously. Formulation #20 shown in Table 5 was prepared using the liquid BaZn stabilizer, M4781A (Galata Chemicals), having a Ba/Zn ratio=5.7 and a 5.33% by wt. phosphorus containing compound while Formulation 32 was stabilized with a solid BaZn salt of unknown composition (NAFTOSAFE™ PKP1028, Chemson Polymer Additive AG) and a phosphite (Doverphos-HIPURE™ 4, ICC Industries). Both formulations contained the same amount of epoxdized soybean oil (secondary plasticizer/heat stabilizer PLASTISOY™ 7, CHS Inc.) and had a Shore hardness value of about 66D. The data in Table 5 shows that Formulation #32 made with the solid BaZn salt stabilizer had an impact strength an order of magnitude lower than that measured for Formulation #20 which had the liquid BaZn stabilizer added. The lower impact strength of Formulation #32 could have been due to lost elasticity of the modifier, if it went through significant degradation during processing or due to dispersion problems. TGA data showed that the activation energy of thermal degradation was significantly lower for Formulation #32 indicating that this sample had lower thermal stability.

TABLE 5

Summary of rigid PVC/PHA F Formulations #20 and #32 prepared with different PVC stabilizers.

|  | Formulation 20 | Formulation 32 |
|---|---|---|
| PVC, K = 70 | 100 | 100 |
| BaZn solid stabilizer |  | 2.5 |
| Epoxidized Soybean Oil | 4.5 | 4.5 |
| Phosphite (HiPure 4) |  | 0.5 |
| BaZn liquid stabilizer | 4 |  |
| PHA F | 28 | 28 |
| Thermal/Mechanical Properties |  |  |
| Tg (° C.) DMA | 32.3 | 36.68 |
| tan δ, max, (° C.) DMA | 70.34 | 72.69 |
| Flex modulus, (MPa) | 1202 | 1214 |
| Notched Izod Impact (ft lb/inch) | >18 | 1.7 |

The above experiment was repeated by adding 18 phr DIDP plasticizer to both #20 and #32 Formulations. The results showed that Formulation #20 again had much higher impact strength as compared to #32 likely due to better thermal stabilization.

Example 3

Addition of Crosslinked PHA to Rigid PVC

In this example, PHA C (40% amorphous rubber P3HB-4HB with 28-32% by wt. 4HB) and H (100% amorphous rubber P3HB-4HB with 55% by wt. 4HB) were crosslinked prior to melt blending with a rigid PVC polymer in order to enhance the impact modification properties of the PVC. Initially, PHA C and H were compounded with a peroxide initiator masterbatch consisting of 5% by weight T101™ peroxide blend with PHA B. For the compounding of PHA C or H with the peroxide masterbatch, a Prism, 16 mm twin screw extruder operating @150 rpm was used with the following extrusion temperatures (inlet to outlet): 172° C./174° C./175° C./177° C./177° C./179° C./179° C./179° C. Following reactive extrusion, the crosslinked PHA C or H was formed into strands and cooled in a water bath set at room temperature. The strands were then dried and cut into pellets or cryogrind under liquid nitrogen into a powder. The final concentration of peroxide in PHA C and H was varied from 0.05 to 0.2% by weight PHA by adding different weights of the peroxide masterbatch. Torsional rheometry was carried out on the compounded PHA's to verify that crosslinking had occurred. PHA C or H was then dry blended with K70 PVC (GG2100) using a two-roll mill @165° C. Samples of the PVC/PHA blend were then compression molded and mechanically tested. Table 6 shows a summary of the PVC/PHA formulations tested and their results.

TABLE 6

Summary of mechanical testing data for rigid PVC/crosslinked PHA blends.

| Formulation | 33 | 34 | 35 | 36 | 37 |
|---|---|---|---|---|---|
| PVC K70 (G2100) | 100 | 100 | 100 | 100 | 100 |
| PHA H (0.15% T101) |  |  | 15 |  |  |
| PLASTISTAB ™ 2442 BaZn thermal stabilizer | 4 | 4 | 4 | 4 | 4 |
| PHA H (0.2% T101) |  |  |  | 15 |  |
| PHA H (0.1% T101) |  | 15 |  |  |  |
| PHA C (0.2% T101) |  |  |  |  | 15 |
| PHA H (0.05% T101)—cryoground | 15 |  |  |  |  |
| Mechanical Properties |  |  |  |  |  |
| Notched Izod Impact, ft lb/inch | 1.05 | 1.40 | 2.13 | 2.25 | 1.62 |
| Flexural Modulus, MPa | 2780 | 2421 | 2439 | 2256 | 2642 |
| Flexural Stress @5%, MPa | 94.4 | 88.5 | 93.8 | 90.5 | 95.1 |
| Tensile toughness, J | 1.04 | 0.90 | 0.75 | 0.99 | 0.79 |
| Tensile modulus, MPa | 2320 | 2265 | 2350 | 2242 | 2145 |

The results in Table 6 show that crosslinking the PHA's with peroxide significantly improved the toughness and impact resistance of the rigid PVC. The highest impact modification was found for the PVC/PHA H blend (%4HB content 55%) where the level of peroxide in the PHA H was at 0.2% by weight PHA. The Notched Izod impact strength can be seen to increase with increasing peroxide concentration in the PVC/PHA H blends. However a decrease in the flexural modulus was observed as the concentration of peroxide increased. A similar trend was observed for the tensile modulus with increasing peroxide concentration. While the addition of peroxide to the PHA C or H was shown to improve the impact properties of the rigid PVC, the concentration would to be optimized depending on the mechanical properties required for a given application.

Example 4

Preparation of PHA Impact Modifier Masterbatch for Rigid PVC

This example outlines a procedure for preparing a PHA impact modifier masterbatch formulation for adding to rigid PVC. The PHA masterbatch was composed of PHA C melt blended with 0.1% by weight TRIGONOX® 117 and 0.1% weight pentaerythritol triacrylate to induce crosslinking/branching of the PHA C polymer (40% rubber P3HB-4HB copolymer with 28-32% 4HB). The crosslinked PHA C polymer was then melt blended in a 2/1 ratio (PHA/polymer) with either ASA (acrylonitrile-stryene-acrylate, Galata Chemicals) or CPE (chlorinated polyethylene, Dow) polymer. After preparation of the masterbatch, it was dry blended with rigid PVC (K=70) and compounded on a two roll mill at 165° C. for about 5 minutes. Test bars were then compression molded from the PVC formulations and tested according to ASTM D790-03 for flexural and ASTM D256-06 for notched Izod impact properties.

TABLE 7

Formulation summary of PHA impact modification masterbatches and rigid PVC. Components are in parts per hundred (phr).

| Component | Formulation #1 | Formulation #2 |
|---|---|---|
| PVC (K = 70) | 84.8 | 84.8 |
| PHA C | 10 | 10 |
| ASA | 5 | — |
| CPE | — | 5 |
| TRIGONOX ® 117 | 0.1 | 0.1 |
| Pentaerythritol triacrylate | 0.1 | 0.1 |

The notched Izod impact and flex modulus results showed that the PVC Formulation #1 having the ASA/crosslinked PHA C masterbatch impact modifier showed a 4-9 times improvement in notched Izod impact as compared to PVC having only ASA impact modifier present while the flex modulus showed a 9% decrease for the ASA/crosslinked PHA C modifier. PVC Formulation #2 with CPE/crosslinked PHA masterbatch showed a 3 times improvement in notch Izod impact properties with a 7% improvement in flex modulus as compared to PVC having only the CPE impact modifier present. The results showed that blending of cross-linked PHA to ASA and CPE commercially available PVC impact modifiers provided synergistic improvements in rigid PVC performance to levels that are nearly equivalent to ABS (acrylate-butadiene-styrene) and MBS (methacrylate-butadiene-styrene) impact modifiers.

Example 5

Addition of a Rubbery PHA to Semi-Rigid PVC—Effect on Thermal and Mechanical Properties In this example, a semi-rigid PVC base resin was first prepared by adding 18 phr DIDP plasticizer. To this base PVC resin, other additives were then mixed in order to evaluate their effect on the thermal and mechanical properties of the semi-rigid PVC blend (formulations #2-8). The PVC additives that were evaluated and compared included PHA D (no rubber PHA present), PHA E (100% rubber PHA) and PHA F (a lower molecular weight version of PHA E) and the KANE™ ACE B22 impact modifier. As a comparison, the semi-rigid PVC base resin without any additives was also included in the analysis.

Table 8 summarizes the thermal and mechanical data collected for the semi-rigid PVC formulations. Also included are qualitative observations on the optical clarity of the formulations. The results in Table 8 showed that at the 5 phr loading level, the rubber PHA E imparted similar impact strength performance to the semi-rigid PVC resin as compared to the commercial impact modifier KANE ACE™ B22. However at the 18 phr loading level, rubber PHA F gave 6 times the impact strength as compared to the 10 phr KANE ACE™ B22 semi-rigid PVC sample. The lower molecular weight of the PHA F likely also contributed to the enhanced impact strength performance. Improved low temperature impact brittleness performance as well as plasticization effect was also observed for the rubber PHA E and F additives as compared to the KANE ACE™ B22 additive. The PHA D (high molecular weight 11%-4HB copolymer) on the other hand did not impart any improvement to the impact strength (at 5° C. and room temperature) which indicated that this copolymer would not be a good choice as an impact modifier for the semi-rigid PVC. This copolymer however still provided significant plasticization as shown by the lower Tg value. Qualitatively it was additionally observed that the PHA additives gave much clearer blends with the semi-rigid PVC base resin when the loading of PHA was 1 to 15 phr.

TABLE 8

Summary of thermal and mechanical properties of semi-rigid PVC @100 phr/PHA additive blends. The semi-rigid PVC resin was compounded with 18 phr DIDP plasticizer.

| | Formulation 2 | Formulation 3 | Formulation 4 | Formulation 5 | Formulation 6 | Formulation 7 | Formulation 8 |
|---|---|---|---|---|---|---|---|
| Semi-rigid PVC + 18phr DIDP | 107.5phr | 107.5phr | 107.5phr | 107.5phr | 107.5phr | 107.5phr | 107.5phr |
| KANE ACE ™ B22 | | 5phr | 10phr | | | | |
| PHA D | | | | | | | 10phr |
| PHA E | | | | 5phr | 10phr | | |
| PHA F | | | | | | 18phr | |
| $T_g$ (° C.) | 35.3 | 41.2 | 46 | 29.2 | 25.6 | 23.1 | 30 |

TABLE 8-continued

Summary of thermal and mechanical properties of semi-rigid PVC @100 phr/PHA additive blends. The semi-rigid PVC resin was compounded with 18 phr DIDP plasticizer.

| | Formulation 2 | Formulation 3 | Formulation 4 | Formulation 5 | Formulation 6 | Formulation 7 | Formulation 8 |
|---|---|---|---|---|---|---|---|
| Tensile Modulus (MPa) | 1298 | 1316 | 1451 | 740 | 469 | 184 | 756 |
| Tensile Strain @Break (MPa) | 152 | 144 | 130 | 174 | 168 | 188 | 168 |
| Tensile Toughness (J) | 4.60 | 3.86 | 3.47 | 4.42 | 4.08 | 3.70 | 5.57 |
| Flexural Modulus (MPa) | 952 | 1057 | 865 | — | — | 149 | 430 |
| Low Temperature Brittleness (5° C.) | failed | failed | failed | passed | passed | passed | Failed |
| Izod Impact Strength (ft lb/in) | 1.25 | 0.95 | 1.93 | 0.94 | — | 7.42 | 0.90 |
| Shore D Hardness | 58 | 67 | 62 | — | — | 50 | 56 |
| Optical Clarity | clear | opaque | opaque | clear | clear | opaque | clear |

The thermal stability of Formulations 2 and 6 in Table 8 were compared using TGA to measure the activation energies for thermal degradation. A third sample was also included for comparison which was composed of PVC with 28 phr of the PHA E and no DIDP plasticizer.

Figure 3:
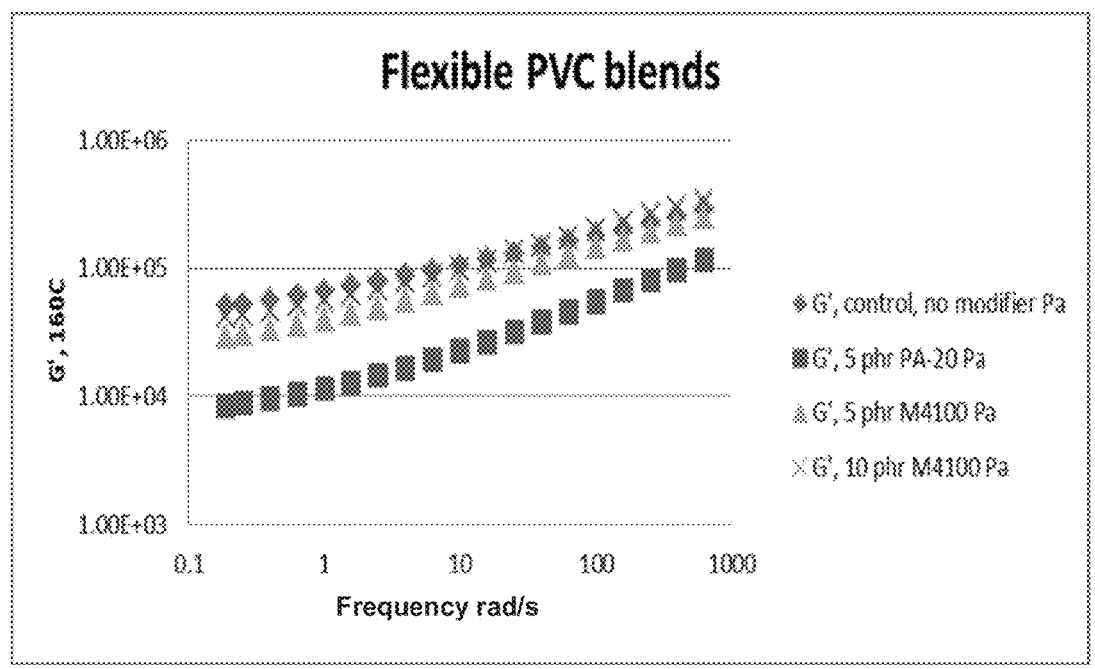
FIG. 3 is a TGA curve of % weight loss versus temperature for a PVC+18 phr DIDP sample. Also shown is the derivative of this curve with the temperature at maximum rate loss shown at the peaks of the curve.
Figure 4:
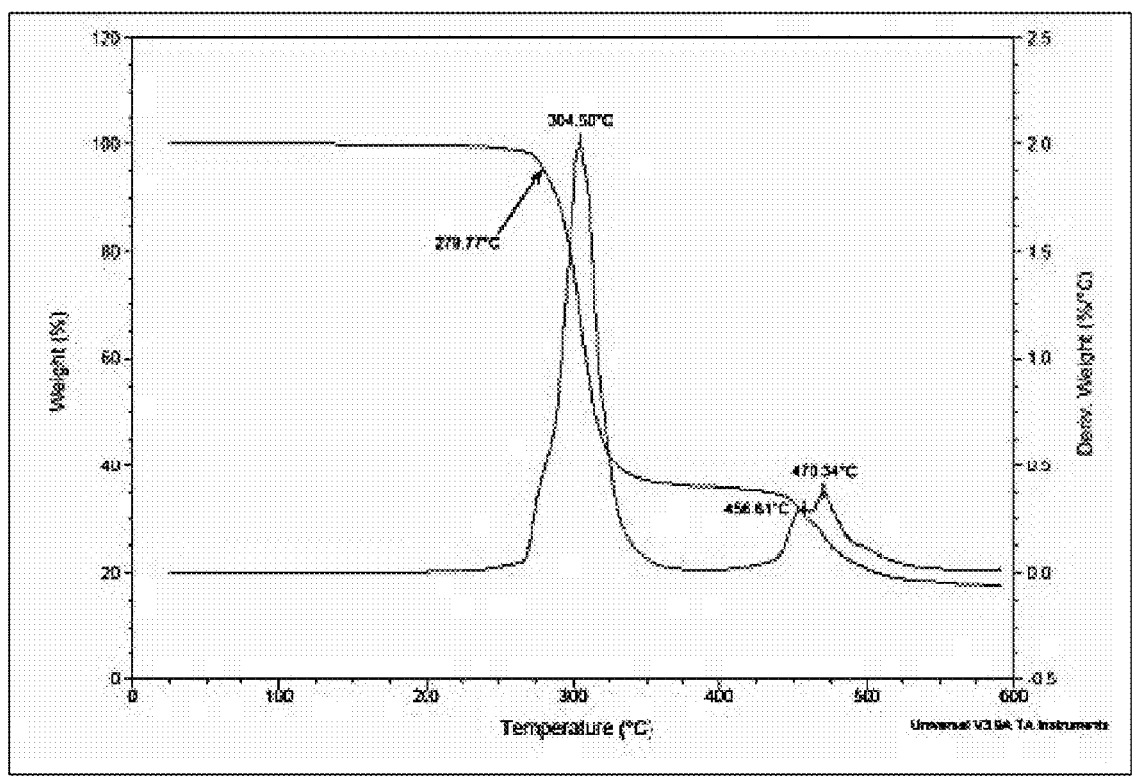
FIG. 4 is an overlay plot of the TGA curves and their derivatives for PVC+18 phr DIDP (dashed line), PVC+10 phr PHA E+18 phr DIDP (solid line) and PVC+28 phr PHA E (dash-dot curve).

FIG. 3 shows the TGA curve and its derivative curve for the PVC+18 phr DIDP (Formulation 2) polymer. Two distinct weight loss events, corresponding to onset of thermal degradation, were observed: the first started at about 280° C. with a peak decomposition temperature at about 304° C. while the second event started at about 450° C. These weight loss events are typical for PVC polymers and correspond to the thermal breakdown of the PVC with a first weight loss generating hydrochloric acid and leaving behind conjugated double bonds while the second weight loss involves the formation and volatilization of cyclic species due to the intramolecular cyclization of the conjugated sequences. FIG. 4 shows an overlay plot of the TGA curves for Formulations 2 and 6 as well as the PVC+28 phr rubber PHA blend. The plot shows that while the onset for thermal degradation in both the first and second weight loss events and are slightly shifted to lower temperatures for the PVC+ rubber PHA blend, the rate of degradation (the peak's height at the first stage of degradation) is lower in the presence of rubber PHA. The temperatures at the maximum rate of degradation are also shifted to higher temperatures for both stages. Table 9 shows for each blend, the $E_a$ for the first and second weight loss events, the temperature at which 5% of the initial sample weight is lost and the temperatures at maximum degradation rate for both the first and second weight loss events at a temperature ramp rate of 20° C./min.

TABLE 9

Summary of TGA data for the PVC/PHA blends.

| Formulation | $E_{a,1}$ (kJ/mole) | $E_{a,2}$ (kJ/mole) | $T_{m1}$ (° C.) | $T_{m2}$ (° C.) | Temp. at 5% Weight Loss (° C.) |
|---|---|---|---|---|---|
| 2 | 116.3 | 252.7 | 304.5 | 457.0 | 287.7 |
| 6 | 115.7 | 287.2 | 308.0 | 463.0 | 280.0 |
| PVC + 28 phr PHA E | 101.6 | 209.2 | 308.4 | 465.0 | 281.4 |

The data in Table 9 shows that for the semi-rigid PVC with the addition of 10 phr PHA E, changes in the thermal degradation onset temperature, the temperatures at maximum degradation rates ($T_{m1}$, $T_{m2}$) were not significantly different when compared to the PVC+18 phr DIDP sample. However it was observed that the $E_{a,2}$ value for the PVC/PHA E 10 phr blend was higher than that for the PVC without PHA. This indicated that the PHA E provided some thermal stabilization to the PVC resin in the second stage of thermal degradation. When the concentration of PHA E was increased to 28 phr, however the activation energies for thermal degradation were found to be lower by 13-17% indicating decreased thermal stability of the PVC.

Example 6

Blends of Semi-Flexible PVC and PHA—Effect on Thermal and Mechanical Properties

In this example a flexible base PVC resin was first prepared containing 36 phr DIDP plasticizer. To this flexible base resin was added PHA A (no rubber PHA present), PHA B (no rubber PHA present), PHA C (40% rubber PHA) and PHA E (100% rubber PHA) as well as the acrylic polymer processing aid KANE ACE™ PA-20 in order to evaluate the effect these additives had on processing of the flexible PVC and the thermal and mechanical properties. Included in the mechanical tests was evaluation of the tear strength of the flexible PVC blends as this is a beneficial property for flexible plastic sheets and films due to the fact that these materials often fail in tearing mode.

Table 10 summarizes the thermal and mechanical test results obtained on the flexible PVC formulations (#9-17) with various blend additives at loading levels of 5 phr and 15 phr. Also included in the table are the results for the base flexible PVC resin with 36 phr DIDP plasticizer added (formulation #9). The results showed that at the 5 phr loading level, the additives composed of the PHA blends (PHA A, B and C) out performed both the commercial acrylic polymer processing aid and PHA E (high molecular weight 100% P3HB-4HB rubber) in terms of lower $T_g$ (higher plasticizing efficiency), higher tensile toughness and higher tear strength. Additionally, it was qualitatively observed that the flexible PVC blends incorporating PHA B and C additives were optically clear and glossy. The data PHA C material and also due to a better miscibility, morphological structure and better melting properties of the PHA C material. Therefore it appears that it is beneficial to optimize both the molecular weight and %4HB in the PHA copolymer or copolymer blend for optimization of the properties of PVC/PHA blends.

Figure 5:
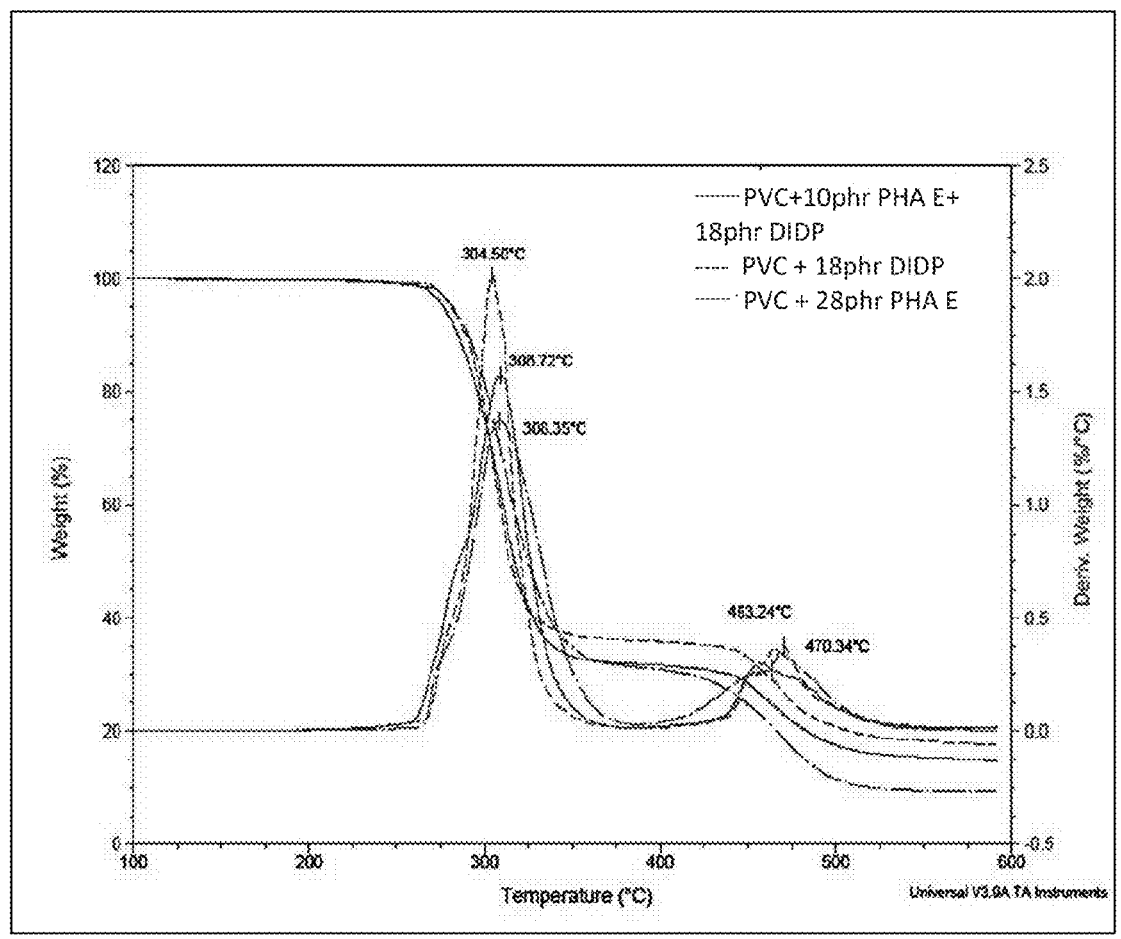
FIG. 5 is a plot showing melt strength versus frequency for flexible PVC (diamonds), flexible PVC/KANE ACE™ PA-20 acrylic polymer @5 phr (squares), flexible PVC/PHA C @5 phr (triangles) and flexible PVC/PHA C @10 phr (crosses).

FIG. 5 shows data for the elastic modulus (melt strength) of the flexible PVC with the additives PHA C (5 and 10 phr) and KANE ACE™ PA-20 acrylic polymer (5 phr). These are plotted against the flexible PVC with no additives. These results showed that the addition of the acrylic polymer significantly reduced the melt strength of the flexible PVC. Whereas when the PHA C was added at the 10 phr loading level, the melt strength did not decrease.

TABLE 10

Summary of Flexible PVC@100 phr/PHA blends thermal and mechanical properties. PHA A, B and C are blends of PHB and P3HB-4HB copolymers. PHA E is a single P3HB-4HB copolymer with 30% by weight 4HB content. The flexible PVC base resin was formulated with 25 or 36 phr DIDP plasticizer.

|  | Formulation 9 | Formulation 10 | Formulation 11 | Formulation 12 | Formulation 13 | Formulation 14 | Formulation 15 | Formulation 16 | Formulation 17 |
|---|---|---|---|---|---|---|---|---|---|
| DIDP | 36phr | 36phr | 36phr | 25phr | 36phr | 25phr | 36phr | 25phr | 36phr |
| KANE™ ACE PA-20 |  | 5phr |  |  |  |  |  |  |  |
| PHA A |  |  | 5phr | 15phr |  |  |  |  |  |
| PHA B |  |  |  |  | 5phr | 15phr |  |  |  |
| PHA C |  |  |  |  |  |  | 5phr | 15phr |  |
| PHA E |  |  |  |  |  |  |  |  | 5phr |
| $T_g$ (° C.) | −5.3 | −1.4 | −4.2 | 14.9 | −5.9 | 14.1 | −5.9 | 15.1 | −1.84 |
| Tensile Toughness (J) | 4.10 | 1.17 | 4.12 | 4.14 | 4.14 | 4.10 | 3.82 | 4.21 | 1.72 |
| Tensile Stress @ 100% elongation (MPa) | 19 | 19 | 20 | 22 | 19 | 22 | 19 | 22 | 15 |
| Tear Strength (N/mm) | — | 31 | 51 | 60 | 50 | 58 | 51 | 64 | 30 |
| Shore D Hardness | 37 | 44 | 35 | 41 | 36 | 42 | 37 | 42 | 37 |
| Optical Clarity | clear | opaque | opaque | opaque | clear | clear | clear | clear | clear | indicates that for flexible PVC's, addition of PHA having % crystallinity in the range of 25-40% imparts improvements to the properties of the flexible PVC properties. Having up to 40% rubber PHA present in the PHA additive was shown to impart better properties to the flexible PVC in terms of toughness of and tear strength. Higher levels of PHA rubber added to the flexible PVC did not impart further improvements in toughness or tear strength.

At the 15 phr loading level for the PHA A, B and C additives, the DIDP plasticizer was able to be reduced without significant changes in the Shore D hardness. The Tg for these blends was shown to increase which indicates a higher softening point which could extend the application ranges for these type of blends. The tear and tensile strength also showed improvement as well. Addition of the PHA C additive appeared to have the largest effect on the thermal and mechanical properties. This PHA was a ternary blend containing 40% by weight PHA rubber and is a multiphase crystalline material. However, FTIR data showed that the flexible PVC blends with PHA C at all loading levels were completely amorphous. Even though PHA C and E are both rubbery materials, the better properties observed with the flexible PVC/PHA C blends versus the flexible PVC/PHA E blends could be due to the lower molecular weight of the Example 7

Effect of PHA on Molecular Weight Retention in PVC/PHA Blends

In this example, semi-rigid PVC's are blended with PHA C and PHA H and the effect of the PHA on molecular weight retention in the PVC after it is thermally processed are investigated. Semi-rigid PVC formulations 1-5 were prepared using a two roll mill as described previously. In addition to the PHA other additives were included such as plasticizers (disodecyl phthalate—DIDP), phosphite (TNNP HIPURE® 4), BaZn heat stabilizers (MARK™ 4781A and NAFTOSAFE® PKP1028), co-heat stabilizers (epoxidized soybean oil PLASTISOY® 7). The PVC's used had K values of 58 and 70 (Mexichem). After thermal processing, the PVC/PHA blends were compression molded into samples and then analyzed by GPC for PVC number average molecular weight. Table 11 shows a summary of the formulations tested and the GPC results. Included in test samples were control samples (Formulation 1 and 4) which contained no PHA.

TABLE 11

Summary of semi-rigid PVC/PHA blends and the effect of adding PHA on final PVC number average molecular weight.

| | Formulation 1 | Formulation 2 | Formulation 3 | Formulation 4 | Formulation 5 |
|---|---|---|---|---|---|
| PVC (K = 70) | 100 | 100 | 100 | | |
| PVC (K = 58) | | | | 100 | 100 |
| PHA C | | 5 | 15 | | |
| PHA H | | | | | 10 |
| DIDP | | | | | |
| PLASTISOY ™ 7 | 4.5 | 4.5 | 4.5 | 4.5 | 4.5 |
| MARK ® 4781A | 4 | 4 | 4 | | |
| DIDP | 36 | 36 | 25 | 18 | 18 |
| NAFTOSAFE ® PK1028 | | | | 2.5 | 2.5 |
| HIPURE ® 4 | | | | 0.5 | 0.5 |
| PVC MW Number Avg. (daltons) | 60,246 | 62,761 | 65,614 | 60,281 | 74,680 |

The results in Table 11 show that with the addition of PHA to the semi-rigid PVC, the molecular weight of the final PVC was maintained or improved by 9-24%.

Example 8

Effect of PHA on the UV Photostability of Semi-Rigid PVC

This examples investigates the effect of PHA additives on the UV/photostability of semi-rigid PVC. The PVC samples (K=70) in this example were compounded with 18 phr DNA (diisononyl adipate) and 15 phr of PHA C or ASA or ABS impact modifiers. Films samples were prepared from the blends and subjected to UV aging (@750, 1250 or 2250 kJ/m$^2$) using a weatherometer according to the ASTM G155-2005 method. After UV aging, the films were measured for UV-induced yellowing using an ARite ColorEye 700A spectrophotometer. Visual inspection of the films samples after UV aging showed pronounced yellowing with the PVC samples containing the commercial acrylic impact modifiers ASA and ABS. The PVC samples with PHA C did not show significant yellowing. Table 12 below summarizes the spectrophotometric results of the PVC films after UV aging.

TABLE 12

Summary of color changes in PVC films after UV aging (2250 kJ/m$^2$).

| PVC Blend | DL* | Da* | Db* | DE* |
|---|---|---|---|---|
| PVC + 18 phr DINA + 15 phr PHA C | 0.76 | −0.32 | −1.00 | 1.30 |
| PVC + 18 phr DINA + 15 phr ASA | −0.84 | −2.91 | 3.67 | 4.76 |
| PVC + 18 phr DINA + 15 phr ABS | −4.42 | −0.61 | 13.65 | 14.36 |

Table 12 shows that the semi-rigid PVC that was blended with PHA C had the least yellowing of the three sample tested (lower Db* and DE* values). The color values Da*, Db* and DL* correspond to the red-green shade difference, yellow-blue shade difference and white shades respectively of a sample on the CIELab Color space chart. The DE* value is the square root of the sum of the squares of the Da*, Db* and DL* values and as such gives an overall indication of color changes. The lower values of Db* and DE* for the PVC+PHA C blend indicated the ability of PHA C to suppress yellowing in the PVC throughout the entire time length of the UV exposure of the PVC/PHA film. Typically PVC products used for outdoor applications contain one or more UV stabilizers which prevent changes in color from occurring. The data in Table 12 indicated that a PVC compounder could use PHA alone as a "UV stabilizer" without having to blend in additional compounds.

Example 9

Effect of PHA on Fungal Resistance of Rigid PVC

In this example, the fungal resistance of rigid PVC/PHA blends were measured using the procedure outlined in ASTM G21-09. A control film of rigid PVC containing 4.5 phr PLASTISOY® 7 (epoxidized soybean oil) and 4 phr PLASTISTAB® 2442 (BaZn stabilizer) was prepared in triplicate. An identical rigid PVC film additionally containing 15 phr PHA C was also prepared in triplicate. Both sets of films were surface treated with a mixture of 5 active test organisms and then incubated for 28 days at 28-30° C. and ≥85% relative humidity. At the end of the test, the films were visually inspected for evidence of fungal growth. The results showed that for the rigid PVC without PHA C, one of the three replicate films showed traces of fungal growth likely due to the presence of epoxidized soybean oil in the formulation. In contrast, the rigid PVC films with the PHA C added showed no signs of fungal growth.

Other than in the examples herein, or unless otherwise expressly specified, all of the numerical ranges, amounts, values and percentages, such as those for amounts of materials, elemental contents, times and temperatures of reaction, ratios of amounts, and others, in the following portion of the specification and attached claims may be read as if prefaced by the word "about" even though the term "about" may not expressly appear with the value, amount, or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains error necessarily resulting from the standard deviation found in its underlying respective testing measurements. Furthermore, when numerical ranges are set forth herein, these ranges are inclusive of the recited range end points (i.e., end points may be used). When percentages by weight are used herein, the numerical values reported are relative to the total weight.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. The terms "one," "a," or "an" as used herein are intended to include "at least one" or "one or more," unless otherwise indicated.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

While this invention has been particularly shown and described with references to preferred embodiments thereof, it will be understood by those skilled in the art that various changes in form and details may be made therein without departing from the scope of the invention encompassed by the appended claims.

What is claimed is:

1. A composition, comprising:
a polymer blend of
   a polyvinyl chloride (PVC) polymer; and
   one or more biobased non-extractable nonvolatile plasticizing polyhydroxyalkanoate (PHA) copolymers,
wherein:
   the one or more PHA copolymers improve performance of the polymer blend; and
   at least one PHA copolymer is a copolymer of 3-hydroxybutyrate and one or more comonomers selected from lactic acid, 3-hydroxypropionic acid (3HP), 4-hydroxybutyrate (4HB), 5-hydroxyvalerate (5HV), 3-hydroxyhexanoate (3HH), 6-hydroxyhexanoate (6HH) and 3-hydroxyoctanoate (3HO), wherein the comonomer content of the at least one PHA copolymer is about 25-90% by weight of the at least one PHA copolymer, and further wherein the one or more PHA copolymers have a percent crystallinity of about 0.2 to 1% as measured by differential scanning calorimetry (DSC).

2. A composition, comprising:
a polymer blend of
   a polyvinyl chloride (PVC) polymer; and
   one or more biobased non-extractable nonvolatile plasticizing polyhydroxyalkanoate (PHA) copolymers selected from 3-hydroxybutyrate-co-4-hydroxybutyrate copolymer, 3-hydroxybutyrate-co-5-hydroxyvalerate copolymer, and 3-hydroxybutyrate-co-6-hydroxyhexanoate copolymer, wherein the content of the 3-hydroxybutyrate in the one or more PHA copolymers is about 25-90% by weight of the one or more PHA copolymers,
wherein:
   one or more properties of the polymer blend selected from fungal resistance, thermal stability, UV photostability and melt flow improve compared to a polymer blend without the one or more PHA copolymers.

3. A composition, comprising:
a polymer blend of
   a polyvinyl chloride (PVC) polymer; and
   one or more biobased non-extractable nonvolatile plasticizing polyhydroxyalkanoate (PHA) copolymers,
wherein:
   the one or more PHA copolymers improve performance of the polymer blend; and
   at least one PHA copolymer is a copolymer of 3-hydroxybutyrate and one or more comonomers selected from lactic acid, 3-hydroxypropionic acid (3HP), 4-hydroxybutyrate (4HB), 5-hydroxyvalerate (5HV), 3-hydroxyhexanoate (3HH), 6-hydroxyhexanoate (6HH) and 3-hydroxyoctanoate (3HO), wherein the comonomer content of the at least one PHA copolymer is about 25-90% by weight of the at least one PHA copolymer, and
   wherein the one or more PHA copolymers are branched with a peroxide and a co-agent.

4. A composition, comprising:
a polymer blend of
   a polyvinyl chloride (PVC) polymer; and
   one or more biobased non-extractable nonvolatile plasticizing polyhydroxyalkanoate (PHA) copolymers,
wherein:
   the one or more PHA copolymers improve performance of the polymer blend; and
   at least one PHA copolymer is a copolymer of 3-hydroxybutyrate and one or more comonomers selected from lactic acid, 3-hydroxypropionic acid (3HP), 4-hydroxybutyrate (4HB), 5-hydroxyvalerate (5HV), 3-hydroxyhexanoate (3HH), 6-hydroxyhexanoate (6HH) and 3-hydroxyoctanoate (3HO), wherein the comonomer content of the at least one PHA copolymer is about 25-90% by weight of the at least one PHA copolymer, and
wherein the polymer blend includes a plasticizer, a barium/zinc stabilizer and an epoxidized soybean oil.

5. The composition of claim 4, wherein the plasticizer is diisononyl adipate.

6. The composition of claim 3, wherein the composition further includes an acrylonitrile-styrene-acrylate terpolymer or chlorinated polyethylene.

7. The composition of claim 6, wherein the co-agent is pentaerythritol triacrylate.

8. A composition, comprising:
a polymer blend of
  a polyvinyl chloride (PVC) polymer; and
  one or more biobased non-extractable nonvolatile plasticizing polyhydroxyalkanoate (PHA) copolymers,
wherein:
  the one or more PHA copolymers improve performance of the polymer blend; and
  at least one PHA copolymer is a copolymer of 3-hydroxybutyrate and one or more comonomers selected from lactic acid, 3-hydroxypropionic acid (3HP), 4-hydroxybutyrate (4HB), 5-hydroxyvalerate (5HV), 3-hydroxyhexanoate (3HH), 6-hydroxyhexanoate (6HH) and 3-hydroxyoctanoate (3HO), wherein the comonomer content of the at least one PHA copolymer is about 25-90% by weight of the at least one PHA copolymer, and
  wherein the composition is optically transparent and has improved UV stability compared to a polymer blend without the one or more PHA copolymers.

9. A composition, comprising:
a polymer blend of
  a polyvinyl chloride (PVC) polymer; and
  one or more biobased non-extractable nonvolatile plasticizing polyhydroxyalkanoate (PHA) copolymers,
wherein:
  the one or more PHA copolymers improve performance of the polymer blend; and
  at least one PHA copolymer is a copolymer of 3-hydroxybutyrate and one or more comonomers selected from lactic acid, 3-hydroxypropionic acid (3HP), 4-hydroxybutyrate (4HB), 5-hydroxyvalerate (5HV), 3-hydroxyhexanoate (3HH), 6-hydroxyhexanoate (6HH) and 3-hydroxyoctanoate (3HO), wherein the comonomer content of the at least one PHA copolymer is about 25-90% by weight of the at least one PHA copolymer, and
wherein the PVC polymer and the one or more PHA copolymers are miscible.

10. A composition, comprising:
a polymer blend of
  a polyvinyl chloride (PVC) polymer; and
  one or more biobased non-extractable nonvolatile plasticizing polyhydroxyalkanoate (PHA) copolymers,
wherein:
  the one or more PHA copolymers improve performance of the polymer blend; and
  at least one PHA copolymer is a copolymer of 3-hydroxybutyrate and one or more comonomers selected from lactic acid, 3-hydroxypropionic acid (3HP), 4-hydroxybutyrate (4HB), 5-hydroxyvalerate (5HV), 3-hydroxyhexanoate (3HH), 6-hydroxyhexanoate (6HH) and 3-hydroxyoctanoate (3HO), wherein the comonomer content of the at least one PHA copolymer is about 25-90% by weight of the at least one PHA copolymer, and
wherein the polymer blend further comprises an additional blend, wherein the additional blend is:
  a) a poly(3-hydroxybutyrate) homopolymer blended with b) a poly(3-hydroxybutyrate-co-4-hydroxybutyrate);
  a) a poly(3-hydroxybutyrate) homopolymer blended with b) a poly(3-hydroxybutyrate-co-3-hydroxyvalerate);
  a) a poly(3-hydroxybutyrate) homopolymer blended with b) a poly(3-hydroxybutyrate-co-3-hydroxyhexanoate);
  a) a poly(3-hydroxybutyrate-co-4-hydroxybutyrate) blended with b) a poly(3-hydroxybutyrate-co-3-hydroxyvalerate));
  a) a poly(3-hydroxybutyrate-co-4-hydroxybutyrate) blended with b) a poly(3-hydroxybutyrate-co-3-hydroxyhexanote, or
  a) a poly(3-hydroxybutyrate-co-3-hydroxyvalerate), blended with b) a poly(3-hydroxybutyrate-co-3-hydroxyhexanoate).

11. The composition of claim 10, wherein the content of polymer (a) in the additional blend is 5 to 95% by weight of the additional blend.

12. A composition, comprising:
a polymer blend of
  a polyvinyl chloride (PVC) polymer; and
  one or more biobased non-extractable nonvolatile plasticizing polyhydroxyalkanoate (PHA) copolymers,
wherein:
  the one or more PHA copolymers improve performance of the polymer blend; and
  at least one PHA copolymer is a copolymer of 3-hydroxybutyrate and one or more comonomers selected from lactic acid, 3-hydroxypropionic acid (3HP), 4-hydroxybutyrate (4HB), 5-hydroxyvalerate (5HV), 3-hydroxyhexanoate (3HH), 6-hydroxyhexanoate (6HH) and 3-hydroxyoctanoate (3HO), wherein the comonomer content of the at least one PHA copolymer is about 25-90% by weight of the at least one PHA copolymer, and
wherein the polymer blend further comprises:
  a) poly(3-hydroxybutyrate) homopolymer blended with b) a poly(3-hydroxybutyrate-co-4-hydroxybutyrate), wherein the content of 4-hydroxybutyrate content in b) is 20-50% by weight of b);
  a) a poly(3-hydroxybutyrate) homopolymer blended with b) a poly(3-hydroxybutyrate-co-5-hydroxyvalerate), wherein the content of 5-hydroxyvalerate in b) is 20% to 50% by weight of b);
  a) a poly(3-hydroxybutyrate) homopolymer blended with b) a poly(3-hydroxybutyrate-co-3-hydroxyhexanoate), wherein the content of 3-hydroxyhexanoate in b) is 5%-50% by weight of b);
  a) poly(3-hydroxybutyrate-co-4-hydroxybutyrate), having the content of 4-hydroxybutyrate at 5% to 15% by weight of a), blended with b) a poly(3-hydroxybutyrate-co-4-hydroxybutyrate), having the content of 4-hydroxybutyrate at 20-50% by weight of b);
  a) poly(3-hydroxybutyrate-co-4-hydroxybutyrate), having the content of 4-hydroxybutyrate at 5% to 15% by weight of a), blended with b) a poly(3-hydroxybutyrate-co-5-hydroxyvalerate), having the content of 5-hydroxyvalerate at a 20% to 50% by weight of b);
  a) a poly(3-hydroxybutyrate-co-4-hydroxybutyrate), having the content of 4-hydroxybutyrate at 5% to 15% by weight of a), blended with b) a poly(3-hydroxybutyrate-co-3-hydroxyhexanoate) having the content of 3-hydroxyhexanoate at a 5%-50% by weight of b);
  a) a poly(3-hydroxybutyrate-co-3-hydroxyvalerate), having the content of 3-hydroxyvalerate at 5% to 22% by weight of a), blended with b) poly(3-hydroxybutyrate-co-4-hydroxybutyrate), having the content of 4-hydroxybutyrate at a 20-50% by weight of b);
  a) a poly(3-hydroxybutyrate-co-3-hydroxyvalerate), having the content of 3-hydroxyvalerate at a 5% to 22% by weight of a), blended with b) a poly(3-hydroxybutyrate-co-5-hydroxyvalerate), having the content of 5-hydroxyvalerate at 20% to 50% by weight of b);
  a) a poly(3-hydroxybutyrate-co-3-hydroxyvalerate), having the content of 3-hydroxyvalerate at 5% to 22% by weight of a) blended with b) a poly(3-hydroxybutyrateco-3-hydroxyhexanoate) having the content of 3-hydroxyhexanoate at a 5%-50% by weight of b);

a) a poly(3-hydroxybutyrate-co-3-hydroxyhexanoate), having the content of 3-hydroxyhexanoate at a 3% to 15% by weight of a), blended with b) a poly(3-hydroxybutyrate-co-4-hydroxybutyrate), having the content of 4-hydroxybutyrate at a 20-50% by weight of b);

a) a poly(3-hydroxybutyrate-co-3-hydroxyhexanoate), having the content of 3-hydroxyhexanoate at 3% to 15% by weight of a), blended with b) a poly(3-hydroxybutyrate-co-5-hydroxyvalerate), having the content of 5-hydroxyvalerate at 20% to 50% by weight of b); or a) a poly(3-hydroxybutyrate-co-3-hydroxyhexanoate), having the content of 3-hydroxyhexanoate at 3% to 15% by weight of a), blended with b) a poly(3-hydroxybutyrate-co-3-hydroxyhexanoate), having the content of 3-hydroxyhexanoate at 5%-50% by weight of b).

13. A composition, comprising:
a polymer blend of
  a polyvinyl chloride (PVC) polymer; and
  one or more biobased non-extractable nonvolatile plasticizing polyhydroxyalkanoate (PHA) copolymers,
wherein:
  the one or more PHA copolymers improve performance of the polymer blend; and
  at least one PHA copolymer is a copolymer of 3-hydroxybutyrate and one or more comonomers selected from lactic acid, 3-hydroxypropionic acid (3HP), 4-hydroxybutyrate (4HB), 5-hydroxyvalerate (5HV), 3-hydroxyhexanoate (3HH), 6-hydroxyhexanoate (6HH) and 3-hydroxyoctanoate (3HO), wherein the comonomer content of the at least one PHA copolymer is about 25-90% by weight of the at least one PHA copolymer,
wherein the impact resistance of the polymer blend as measured by notched izod impact is 3 to at least 18 ft lb/in.

14. An article comprising a composition, comprising:
a polymer blend of
  a polyvinyl chloride (PVC) polymer; and
  one or more biobased non-extractable nonvolatile plasticizing polyhydroxyalkanoate (PHA) copolymers,
wherein:
  the one or more PHA copolymers improve performance of the polymer blend; and
  at least one PHA copolymer is a copolymer of 3-hydroxybutyrate and one or more comonomers selected from lactic acid, 3-hydroxypropionic acid (3HP), 4-hydroxybutyrate (4HB), 5-hydroxyvalerate (5HV), 3-hydroxyhexanoate (3HH), 6-hydroxyhexanoate (6HH) and 3-hydroxyoctanoate (3HO), wherein the comonomer content of the at least one PHA copolymer is about 25-90% by weight of the at least one PHA copolymer, and
  wherein the article has greater tensile elongation with greater tensile toughness than a corresponding polymer article consisting only of a PVC polymer.

* * * * *